(12) United States Patent  
Saito

(10) Patent No.: US 6,722,554 B2
(45) Date of Patent: Apr. 20, 2004

(54) SOLDERING APPARATUS

(75) Inventor: Takashi Saito, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/955,106

(22) Filed: Sep. 19, 2001

(65) Prior Publication Data

US 2002/0036223 A1 Mar. 28, 2002

(30) Foreign Application Priority Data

Sep. 26, 2000 (JP) ..................... P2000-292012
Jul. 26, 2001 (JP) ..................... P2001-226721

(51) Int. Cl.[7] .............. B23K 1/08; B23K 31/02; B23Q 15/00
(52) U.S. Cl. .............. 228/37; 228/9; 228/260
(58) Field of Search .............. 228/37, 8, 9, 260, 228/102, 103, 105

(56) References Cited

U.S. PATENT DOCUMENTS

| 4,465,219 | A | * | 8/1984 | Kondo ............ 228/37 |
| 4,512,508 | A | | 4/1985 | Pachschwoll |
| 4,697,730 | A | | 10/1987 | Spigarelli et al. |
| 4,771,929 | A | * | 9/1988 | Bahr et al. ............ 228/102 |
| 4,981,249 | A | * | 1/1991 | Kawashima et al. ...... 228/37 |
| 5,148,963 | A | * | 9/1992 | Hicks .............. 228/102 |
| 5,176,312 | A | * | 1/1993 | Lowenthal ............. 228/180.1 |
| 5,240,169 | A | * | 8/1993 | Gileta .............. 228/180.1 |
| 5,415,337 | A | * | 5/1995 | Hogan et al. ........... 228/223 |
| 5,725,143 | A | * | 3/1998 | Leturmy .............. 228/37 |
| 6,138,890 | A | * | 10/2000 | Kanno et al. ........... 228/37 |
| 6,265,017 | B1 | * | 7/2001 | Hogan et al. ........... 427/8 |
| 6,273,319 | B1 | * | 8/2001 | Ichikawa et al. ........ 228/102 |

FOREIGN PATENT DOCUMENTS

| DE | 18541340 A1 | | 5/1997 |
| JP | 410153473 A | * | 6/1998 |
| JP | 2000196230 | | 7/2000 |

OTHER PUBLICATIONS

Austrian Search Report and Writton Opinion.

* cited by examiner

Primary Examiner—Tom Dunn
Assistant Examiner—Colleen P. Cooke
(74) Attorney, Agent, or Firm—Rader, Fishman & Grauer PLLC; Ronald P. Kananen, Esq.

(57) ABSTRACT

Soldering apparatus designed to apply soldering, by means of jetting out streams of molten solder, which is gathered in a solder bath, to a piece to be soldered carried in a predetermined direction. While jetting out molten solder from the solder bath, a drive means in the apparatus supplies drive for setting the relative position between the end of the jet-stream nozzle and the piece and a control means also available outputs control signals matching a predetermined condition to the drive means to carry out micro-adjustment of the jet-stream nozzle in short time with high accuracy. At the same time, remote operation can also be performed.

39 Claims, 12 Drawing Sheets

FIG.11A
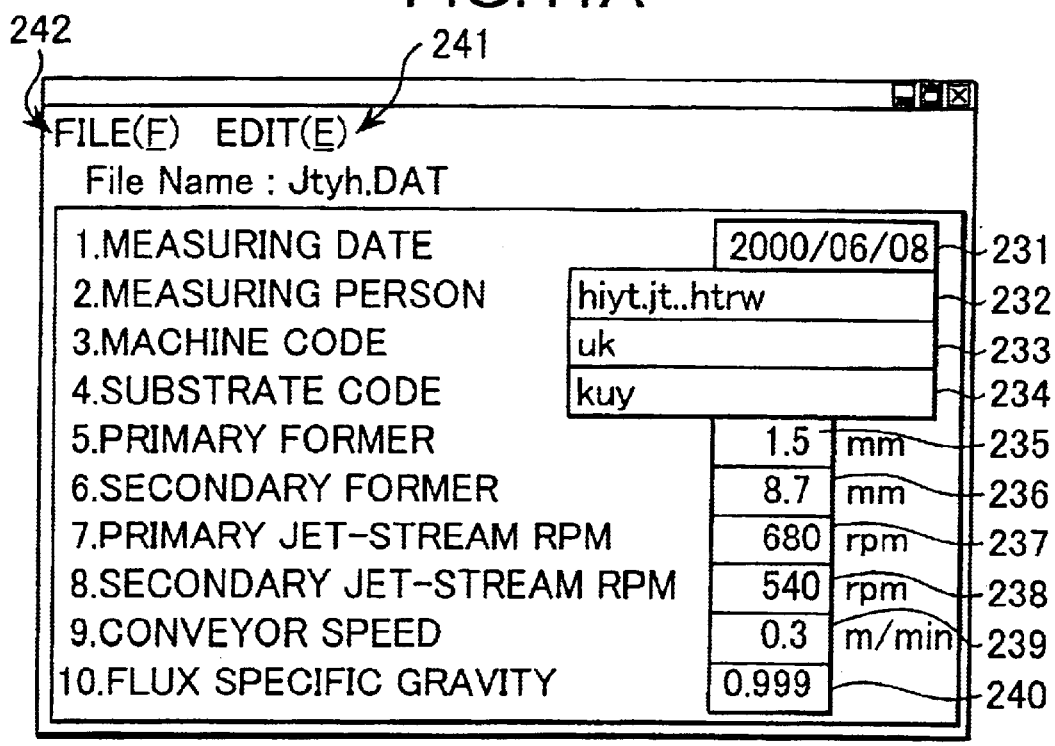
FIG.11B
| EDIT(E) | |
|---|---|
| BATCH READING OF MONITOR VALUES | Ctrl+R |
FIG.11C
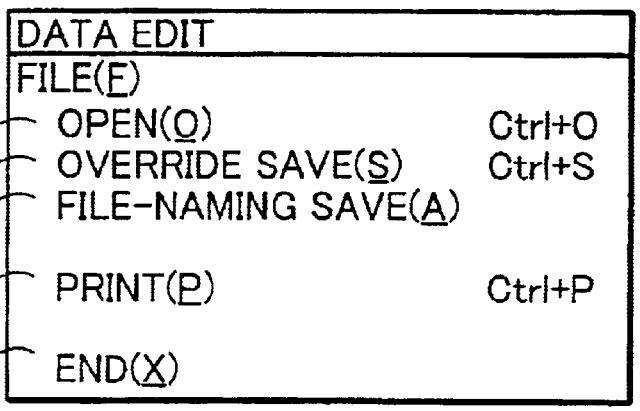

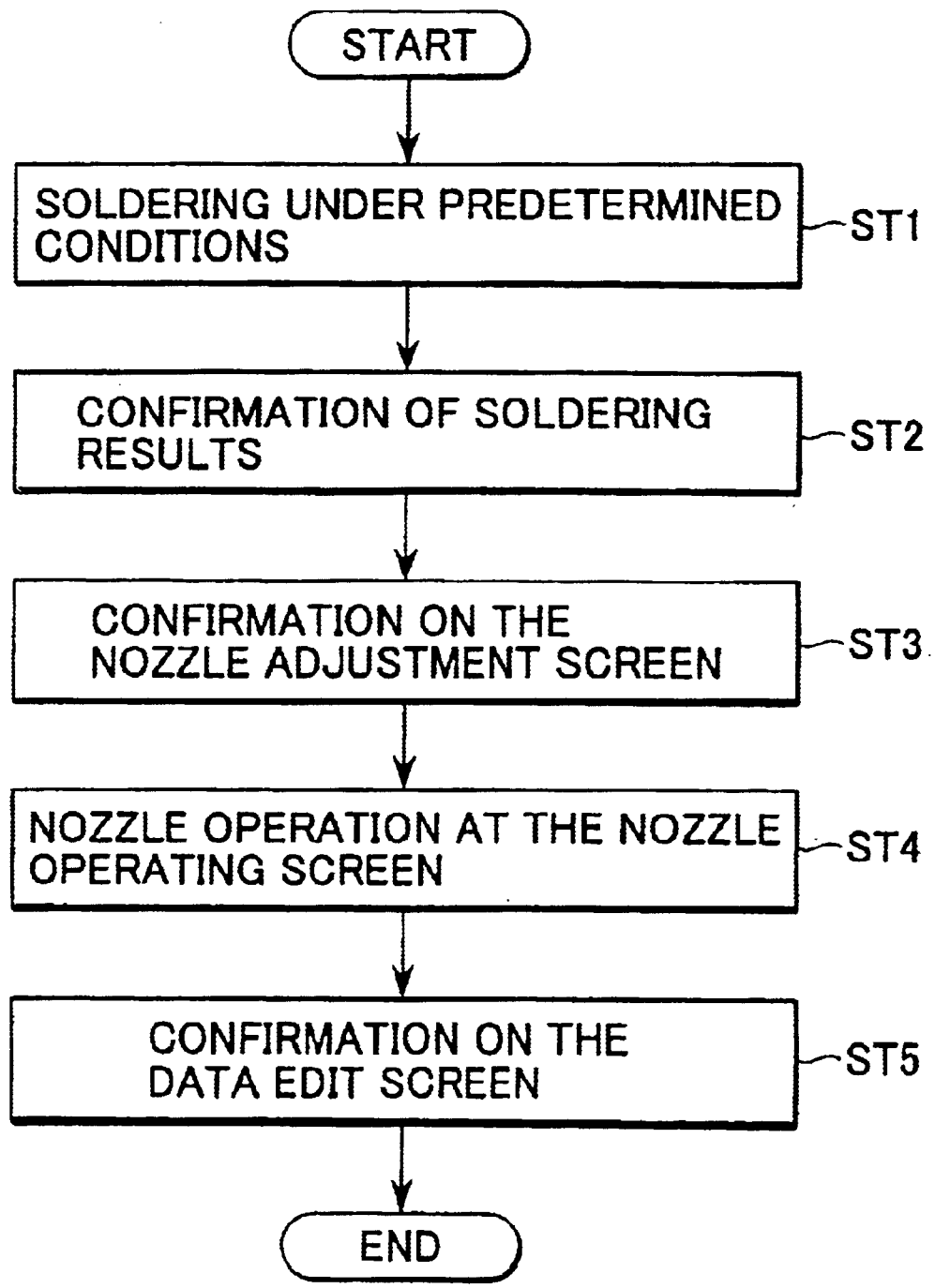

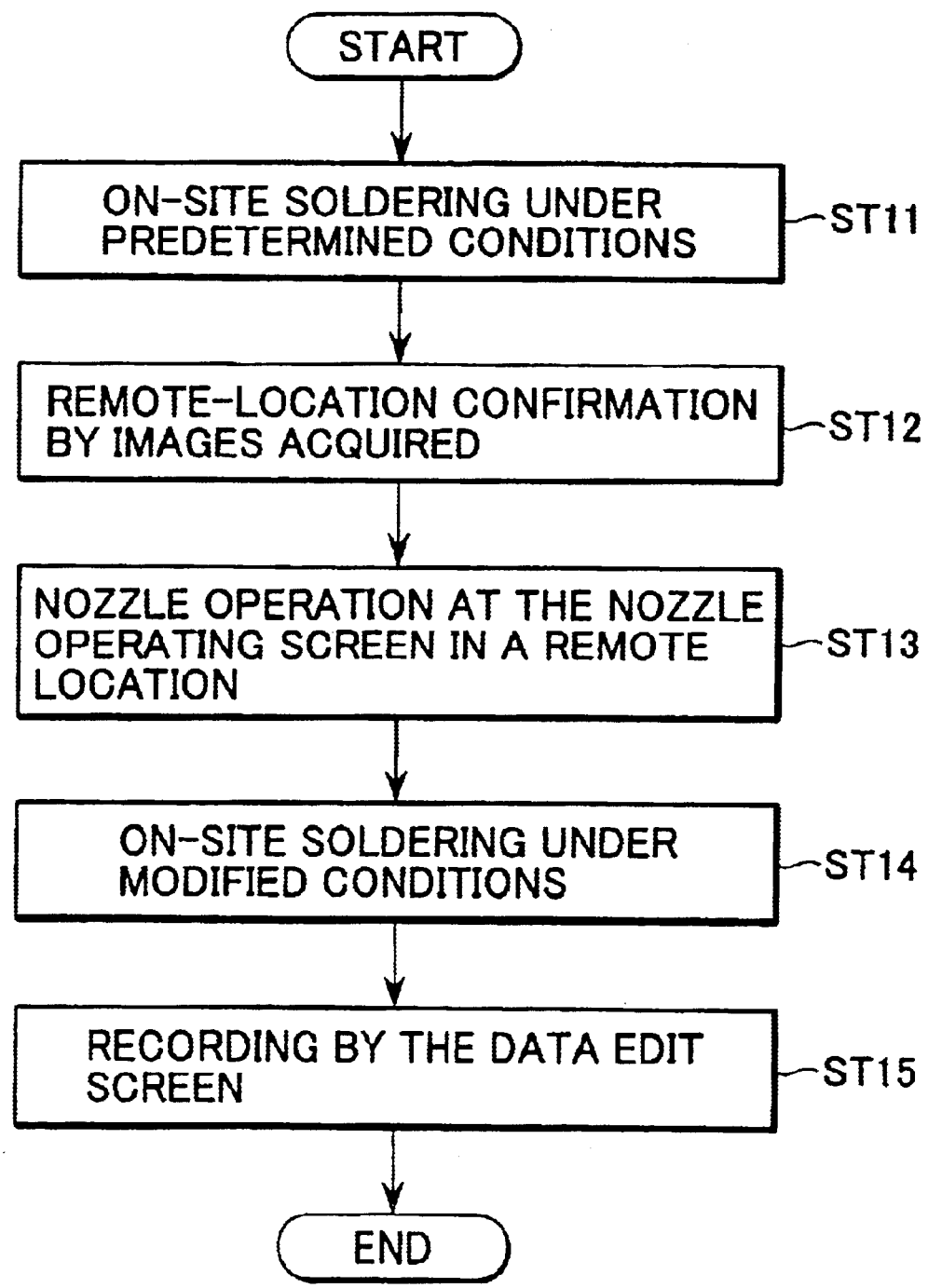

SOLDERING APPARATUS

BACKGROUND OF THE INVENTION

1. Field of the Invention

The present invention relates to a soldering apparatus which performs soldering by jetting out streams of molten solder accumulated in a solder bath and permitting solder to come in contact with a piece to be soldered.

2. Description of the Related Art

There are various types of soldering apparatuses. FIG. 1 shows an example of an apparatus using a jet stream nozzle 12 of the fillet up nozzle type disposed in a solder bath 3.

The structure of the principal section around the fillet up nozzles (12a and 12b) of the soldering apparatus 1a is made up of the solder bath 3 accumulating solder 7, heating means 13 for the solder 7, a jet-stream nozzle 12a of the primary side disposed in the solder bath 3, and a jet-stream nozzle 12b of the secondary side of the fillet up nozzle type or the like, as illustrated. Note that a conveyor 5a slanted upward in the direction of travel is provided above the jet-stream nozzle 12a of the primary side and the jet-stream nozzle 12b of the secondary side, a mounted substrate 4 to be soldered being attached to this conveyor 5a.

FIG. 2 schematically shows the jet-streaming condition of solder from the secondary side jet-stream nozzle 12b of the type presented in FIG. 1. This secondary side jet-stream nozzle 12b consists essentially of a front former 14 and a rear former 15, with the solder in the solder bath 3 of FIG. 1 being sent to between the front former 14 and the rear former 15 by a pump or a similar device not illustrated herein, and the solder thus sent being separated by the front former 14 and the rear former 15 into the direction reverse to the direction of travel of the conveyor 5a and into the direction positive thereto, as shown above.

Solder streams 16 and 17 separated before and after this process run into contact point A and contact point B relative to the mounted substrate 4 and flow out. The point A and the point B are called the peel back points of the solder stream, and, the length between A and B is called the DIP length, over which the solder 7 migrates and settles on the electrodes of the mounted substrate 4 and solder land, whereby the soldering process is implemented.

As described above, as to improve the soldering quality of the mounted substrate 4, it is necessary to control various conditions at each section of the soldering apparatus such as a conveying speed of the conveyor 5a proper for the type of solder, a temperature of the solder bath 3, a flux specific gravity, a preheater temperature, and a post-soldering cooling condition, all at optimum levels. Above all, most critical conditions include a flow speed, waveform, and wave amplitude of the jet stream of the solder.

Since the flow speed, the waveform, and the wave amplitude of the jet stream of the solder from the jet-stream nozzle vary with small variations in height, position and the like of the front former 14 and the rear former 15, it becomes necessary to optimize position, angle , etc. of the front former 14 and the rear former 15 by taking into consideration such factors as the condition at each portion of the apparatus at a given moment and the soldering conditions of the mounted substrate.

However, inasmuch as the prior art adjustments of the front and rear formers 14 and 15 of the jet-stream nozzles 12a and 12b are manually performed by using nuts and screws, conventional practice has been for the skilled worker to adjust the position and angle of each portion of the nozzle to the optimum levels while visually checking the finish status of the soldering results.

Consequently, the practice of manually adjusting the nozzles has made making micro-adjustments an extremely arduous task, resulting in problems of disparate soldering quality, low product yield, and low productivity.

Another problem is that it is impossible to perform timely controlling while moving the mounted substrate, so that application of optimum soldering conditions requires time. There is a further complication in that reproduction of the optimum soldering conditions is not an easy matter when a machine change is made.

Likewise, in the case in which the above-mentioned soldering apparatus is installed in production facilities spread across many areas of the country, the quality of soldering deteriorates in a particular facility in an area where skilled workers are hard to find, thus creating a situation where it is difficult to assure stable productivity throughout all related production facilities.

Moreover, in recent years, environmental problems have given rise to a demand for switching to lead-free soldering, thereby bringing about prospects of different soldering conditions than those thus far known in regard to the flux used, soldering properties and other factors, narrower margin of optimum soldering conditions than before, and difficulty of performing good soldering, wherefore it is considered likely that the problems enumerated above may become a reality to make the maintenance and control of soldering quality more and more difficult.

SUMMARY OF THE INVENTION

The present invention is directed to solving these problems, and it is preferable to provide a soldering apparatus which can perform timely micro-adjustments of the jet-stream nozzle in a short period of time with good accuracy, which contributes to improving the quality of soldering, improving workability, and improving operating efficiency, which can be operated and controlled by an operator with a relatively low degree of proficiency, and which can smoothly cope with any change in the apparatus.

According to an embodiment of the present invention, a soldering apparatus is provided, which can perform timely control of the optimum soldering conditions and do so from a remote place, and from which an improved quality of soldering can be obtained even by an operator with a relatively low degree of proficiency.

The soldering apparatus of the present invention is a soldering apparatus which operates to let molten solder accumulated in the solder bath to jet out a stream for soldering a piece to be soldered while the piece is conveyed in a predetermined direction, the apparatus including a jet-stream nozzle jetting out streams of molten solder in the solder bath, and having an end that can turn, drive means for driving a relative position of the end of the jet-stream nozzle to a predetermined position relative to the piece to be soldered, and control means for outputting the control signal to the drive means according to such predetermined position.

The jet-stream nozzle with the end is composed of a front former disposed at the end of the nozzle body on the upstream side of the conveying direction of the piece to be soldered and a rear former disposed at the end of the nozzle body on the downstream side of the conveying direction of the piece to be soldered, at least one of either the front former or the rear former being set up in such a way so as to be moved by the drive means receiving the control signal.

The drive means has a first drive means for driving the front former so that the front former is in a predetermined position and angle relative to the piece to be soldered.

The drive means is also made up of a second drive means for driving the rear former so that the rear former is in a predetermined position and angle relative to the piece to be soldered.

The soldering apparatus of the present invention further includes an image capture means for acquiring images of the jet-streaming condition of molten solder from the jet-stream nozzle and display means for displaying a condition of the jet-streaming of the molten solder, images of which are captured by the image capture means.

The control means stores other soldering conditions, together with the position of the end of the jet-stream nozzle relative to the piece to be soldered for each piece to be soldered.

The soldering apparatus of the present invention further includes second control means connected to the first control means via a communication line, the second control means outputting to the control means control signals for controlling via the communication line so that at least the end of the jet-stream nozzle is in a predetermined position relative to the piece to be soldered.

The second control means stores other soldering conditions, together with the position of the end of the jet-stream nozzle relative to the piece to be soldered for each piece to be soldered.

The soldering apparatus of the present invention further comprises second control means connected to the control means and the image capture means via a communication line and second display means for displaying acquired images inputted via the communication line from the image capture means, the second control means outputting to the control means control signals for controlling via the communication line so that at least the end of the jet-stream nozzle is in a predetermined position relative to the piece to be soldered.

The second control means stores other soldering conditions, together with the position of the end of the jet-stream nozzle relative to the piece to be soldered for each piece to be soldered.

The front former having a front support shaft supported by the nozzle body is provided so as to turn relative to the front support shaft.

The first drive means includes a pressure rod that can be driven vertically, the front former having a U-shaped member provided so as to turn relative to the front support shaft serving as a pivot, the end of the U-shaped member being supported by the pressure rod.

The rear former having a rear support shaft supported by the nozzle body is provided so as to turn relative to the rear support shaft.

The second drive means has a pressure rod drivable vertically, one end of the rear former provided so as to turn relative to the rear support shaft serving as a pivot, the other end being supported by the pressure rod.

The front former is provided so as to turn relative to the support shaft, while the first drive means is provided with both ends thereof moving vertically with an intermediate point as a fulcrum, including a first drive mechanism which, with its one end being linked to a first lever-shaped member holding up the front former and to one end of the first lever-shaped member, moves the one end of the first lever-shaped member vertically.

The first drive mechanism has a first motor and a first ascent and descent member with its one end screwed onto the shaft of the first motor and its other end linked to the lever-shaped member, which performs the ascent and descent movement corresponding to the number of revolutions of the first motor.

The rear former is provided so as to be able to turn relative to the support shaft, while the second drive means is provided with both ends thereof moving vertically with an intermediate point as a fulcrum, comprising a second drive mechanism which, with its one end being linked to a second lever-shaped member bearing the rear former and to one end of the second lever-shaped member, moves the one end of the second lever-shaped member vertically.

The second drive mechanism is made up of a second motor and a second ascent and descent member with its one end screwed onto the shaft of the second motor and its other end linked to the second lever-shaped member, which performs ascent and descent movement corresponding to the number of revolutions of the second motor.

The soldering apparatus of the present invention also has a flux supply means for supplying flux to the piece to be soldered that is positioned further on the side in the conveying direction of the piece to be soldered than the solder bath.

The soldering apparatus of the present invention additionally has a preheating means, disposed in between the flux supply means and the solder bath, for preheating the piece to be soldered that is coated with the flux.

Furthermore, in order to accomplish the objects described above, the solder apparatus of the present invention is a solder apparatus which applies solder to the piece to be soldered being conveyed in the predetermined direction by causing molten solder accumulated in the solder bath to jet out in stream, the apparatus comprising a primary jet-stream nozzle which jets out streams of molten solder in the solder bath and a secondary jet-stream nozzle which is disposed further downstream in the conveying direction of said piece to be soldered than the primary jet-stream nozzle, jetting out streams of molten solder in the solder bath and having a end that can be turned, drive means for driving so that the relative position of the end of the secondary jet-stream nozzle to the piece to be soldered may be in the predetermined condition, and control means for outputting the control signal corresponding to the predetermined condition to the drive means.

In the aforementioned soldering apparatus of the present invention, the soldering process is conducted as the molten solder in the solder bath is jetted out in a stream by the jet-stream nozzle with the end that can be turned so as to permit the piece to be soldered to come in contact with the molten solder.

Then, if it is desired to change the jet streaming condition of the molten solder from the jet-stream nozzles, the control signal corresponding to the relative position of the end of a nozzle that is desired to be varied is outputted by the control means to the drive means.

By virtue of the drive means, to which the control signal is inputted, the end of the jet-stream nozzle is driven so as to be in a position corresponding to the control signal.

Since, in this manner, adjustments of the position of the end of the jet-stream nozzle can be performed not manually but by using the control means and the drive means, timely micro-adjustments can be accomplished easily and the relative position of the end of the jet-stream nozzle can be varied in a short time with good accuracy.

In addition, storing in the control means other soldering conditions, together with the relative position of the end of the jet-stream nozzle to the piece to be soldered for each piece to be soldered makes it possible to reproduce at any time the soldering conditions that have been stored.

Further, by capturing images of the jet-streaming condition of the molten solder from the jet-stream nozzle through the image capture means, and by displaying the jet-streaming condition of the molten solder through the display means, it is possible to observe the jet-streaming condition of the molten solder, enabling the images acquired to be fed back to the soldering conditions in a timely manner.

Moreover, through the secondary control means connected via the communication line to the control means, the control signal controlling at least the positional status of the end of the jet-stream nozzle is outputted via the communication line and through the control means in receipt thereof, the control signal corresponding to such positional status is outputted to the drive means, whereupon through the drive means, the end of the jet-stream nozzle is driven so as to be in the relative position corresponding to the control signal.

As a result, remote operation of the jet-stream nozzle can be performed.

BRIEF DESCRIPTION OF THE DRAWINGS

The foregoing and other objects, features and advantages of the present invention will be apparent to those skilled in the art from the following description of the presently preferred exemplary embodiments of the invention taken in connection with the accompanying drawings, in which:

FIG. 11, consisting of FIGS. 11A to 11C, is a diagram showing an example of a Data Edit screen displayed on the monitor of a personal computer used for a soldering apparatus of the first preferred embodiment according to the present invention.

FIG. 12 is a flowchart explaining how to use a soldering apparatus of the first preferred embodiment according to the present invention;

FIG. 14 is a flowchart explaining the operation of a soldering apparatus of the second embodiment according to the present invention.

DETAILED DESCRIPTION OF THE PREFERRED EMBODIMENTS

Preferred embodiments of a soldering apparatus according to the present invention will be described below with reference to the drawings. The same reference numbers will be used for expressing the same component members as in the Description the Related Art above.

First Preferred Embodiment

Figure 3:
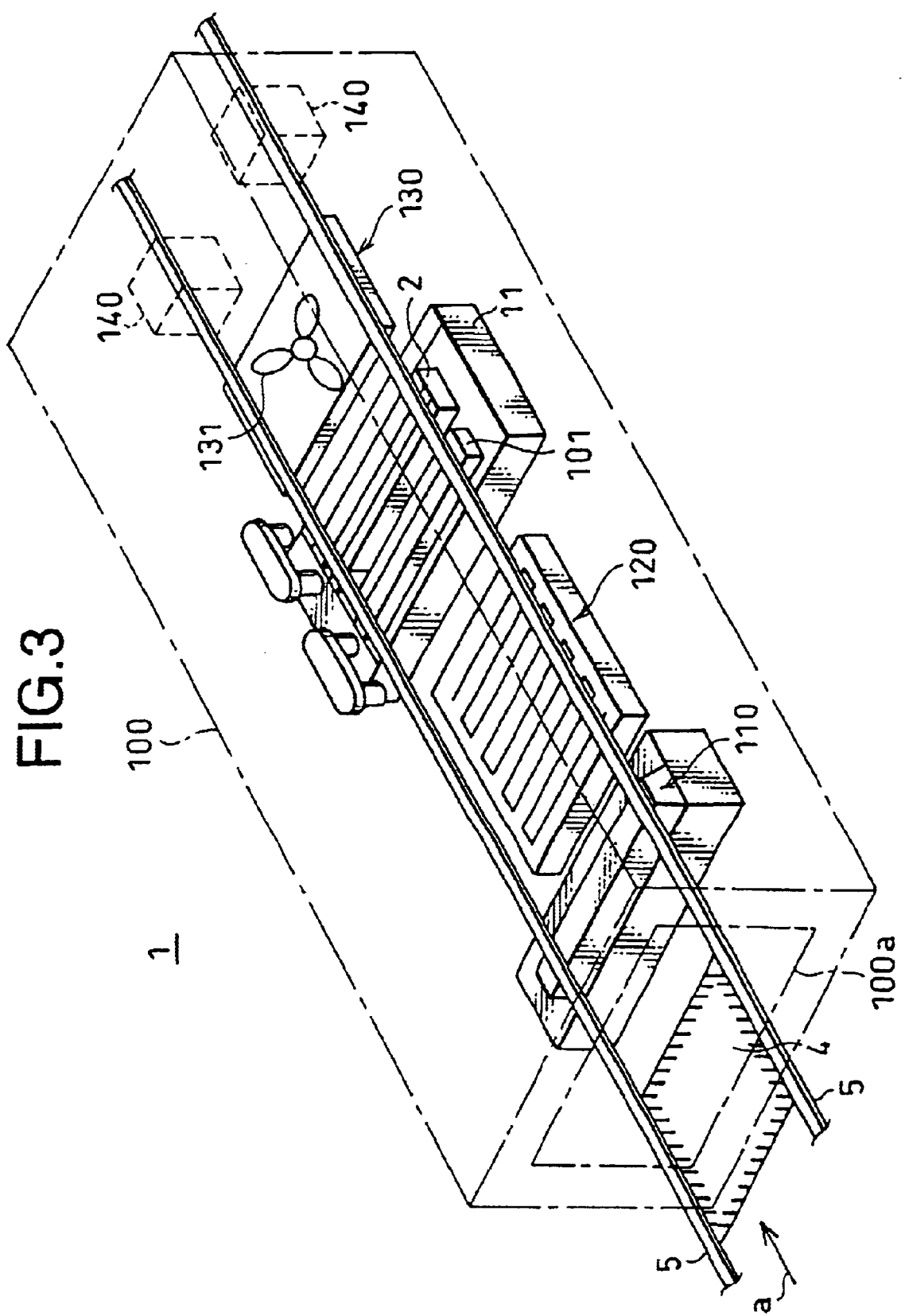
FIG. 3 shows an overview structure of a soldering apparatus of a first preferred embodiment according to the present invention.

FIG. 3 shows a schematic diagram illustrating the entire construction regarding principal sections of a soldering apparatus 1 of a first preferred embodiment.

The soldering apparatus 1 generally includes conveying means 5, such as a conveyor, a flux coating unit 110, a preheater 120, a solder bath 11, a cooler 130, and a cleaning unit 140.

The conveying means 5 supports edges on both sides of a mounted substrate 4 and conveys the mounted substrate 4 in the direction of arrow (a) at a predetermined conveying speed. This permits the mounted substrate 4 to be sent from an opening 100a provided at a frame 100 to inside the soldering apparatus 1.

The flux coating unit 110 coats flux on the surface to be soldered of the mounted substrate 4. Flux purports to secure wetness of subsequent soldering, removing a superficial oxide film through chemical reaction to ensure that the molten flux is adequately wet with the mounted substrate 4.

This coating of flux is performed with the flux bubbled by introducing compressed air through a bubble pipe provided in the flux liquid. Bubbling enables the flux to be coated uniformly inside the through holes and between leads.

The preheater 120 is, for example, made of a stick-shaped heater, a panel heater or the like, preheating the mounted substrate 4. By this preheating, the solvent portion of the flux is evaporated and dried, and a drastic thermal shock upon soldering is alleviated, reducing deformation (warping and bending) of the mounted substrate 4.

The solder bath 11 is, as described later, where solder accumulated inside the solder bath 11 is heated by a heater (not shown) to bring it to a molten state so that the solder can flow, jetting out in a stream from the nozzles to carry out the soldering process.

The solder bath 11 is made, up of a primary jet-stream nozzle 101 and a secondary jet-stream nozzle 2, for jetting out a stream of molten solder from the primary jet-stream nozzle 101 and the secondary jet-stream nozzle 2.

In this instance, the primary jet-stream nozzle 101 implements the soldering process fully with a strong jet stream to prevent any open defect.

The secondary jet-stream nozzle 22 arranges the solder supplied by the primary jet-stream nozzle in uniform quantities of solder to eliminate any bridge defect.

The cooler 130 is provided with a cooling fan 131, cooling by the cooling fan 131 the mounted substrate 4 upon its release from the solder bath 11.

The cleaning unit 140 removes unnecessary flux or any other similar material deposited on the mounted substrate 4.

The entire soldering process in the preceding soldering apparatus 1 will be described.

First, by virtue of the conveying means 5 holding edges of both sides of the mounted substrate, the mounted substrate 4 is conveyed at the predetermined speed in the direction of arrow (a), and the mounted substrate 4 is sent from an opening 100a provided at a frame 100 to inside the soldering apparatus 1.

Then, inside the frame 100, the mounted substrate 4 is further conveyed by the conveying means 5 in the direction of arrow (a), whereupon flux is first coated on the soldering face (underside) of the mounted substrate by the flux coating unit 110, followed by preheating of the mounted substrate 4 by the preheater 120.

While the underside of the mounted substrate 4 is in contact with the molten solder jetting upward respectively from the primary jet-stream nozzle 101 and the secondary jet-stream nozzle 2, the mounted substrate 4 is conveyed in the direction of arrow (a) at the predetermined speed.

This enables leads, a circuit portion not shown, respectively provided on the top side of the mounted substrate 4, to be soldered from the underside of the mounted substrate 4.

When the soldering process in the solder bath 11 is completed in this manner, the mounted substrate 4 is further conveyed by the conveying means 5 in the direction of arrow (a), the mounted substrate 4 being cooled by the cooling fan 131 at the cooler 130 and unnecessary flux deposited on the mounted substrate 4 being removed at the cleaning unit 140.

In the foregoing manner, the soldering process of the mounted substrate 4 in the soldering apparatus 1 is completed, and the mounted substrate 4 is conveyed by the conveying means 5 to outside the soldering apparatus 1.

Next, the detailed construction of the preceding soldering apparatus including the drive system of the solder bath 11 will be described.

Figure 4:
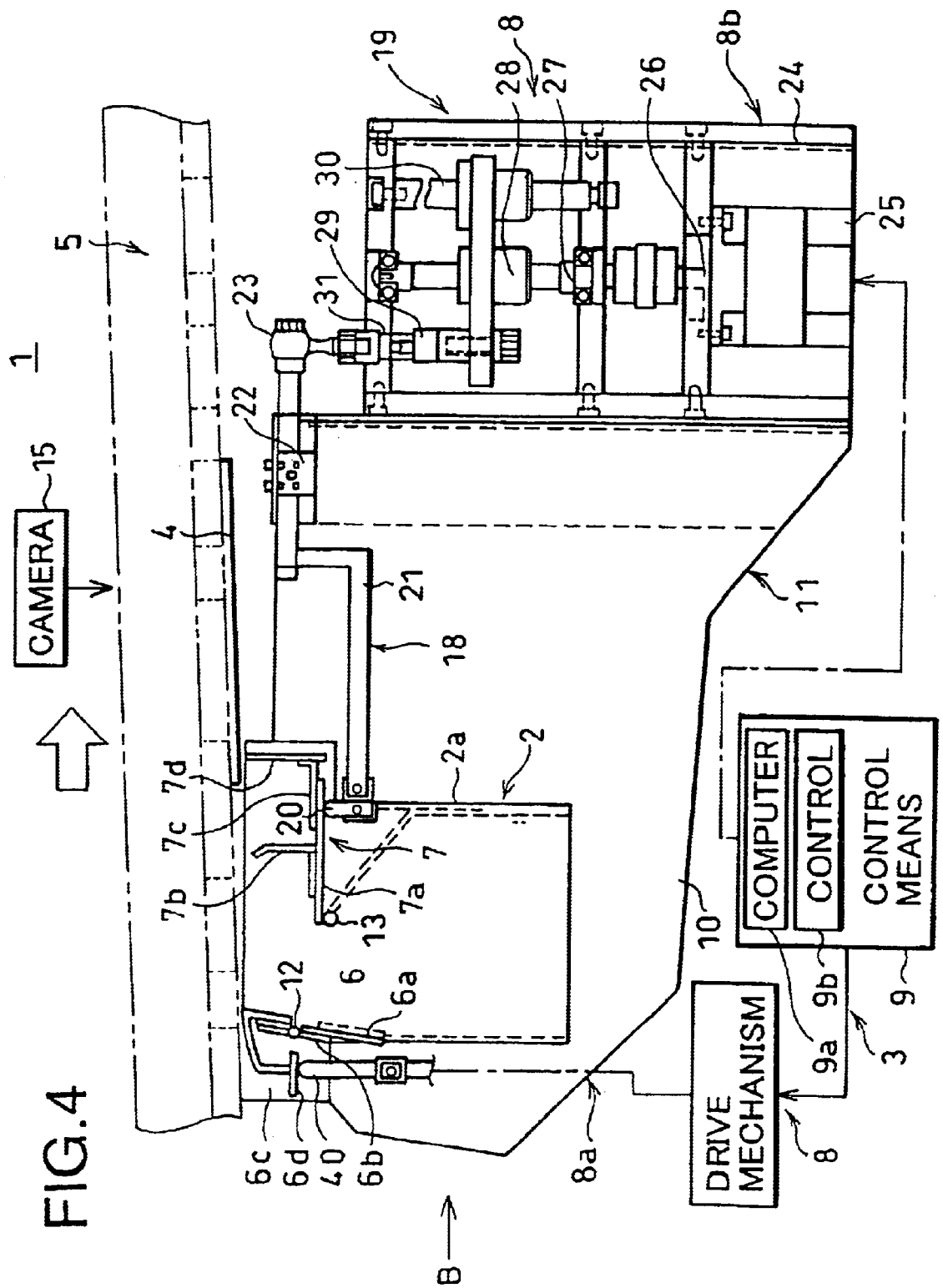
FIG. 4 shows the construction of a solder bath including a rear former drive of a soldering apparatus of the first preferred embodiment of the present invention.
Figure 5:
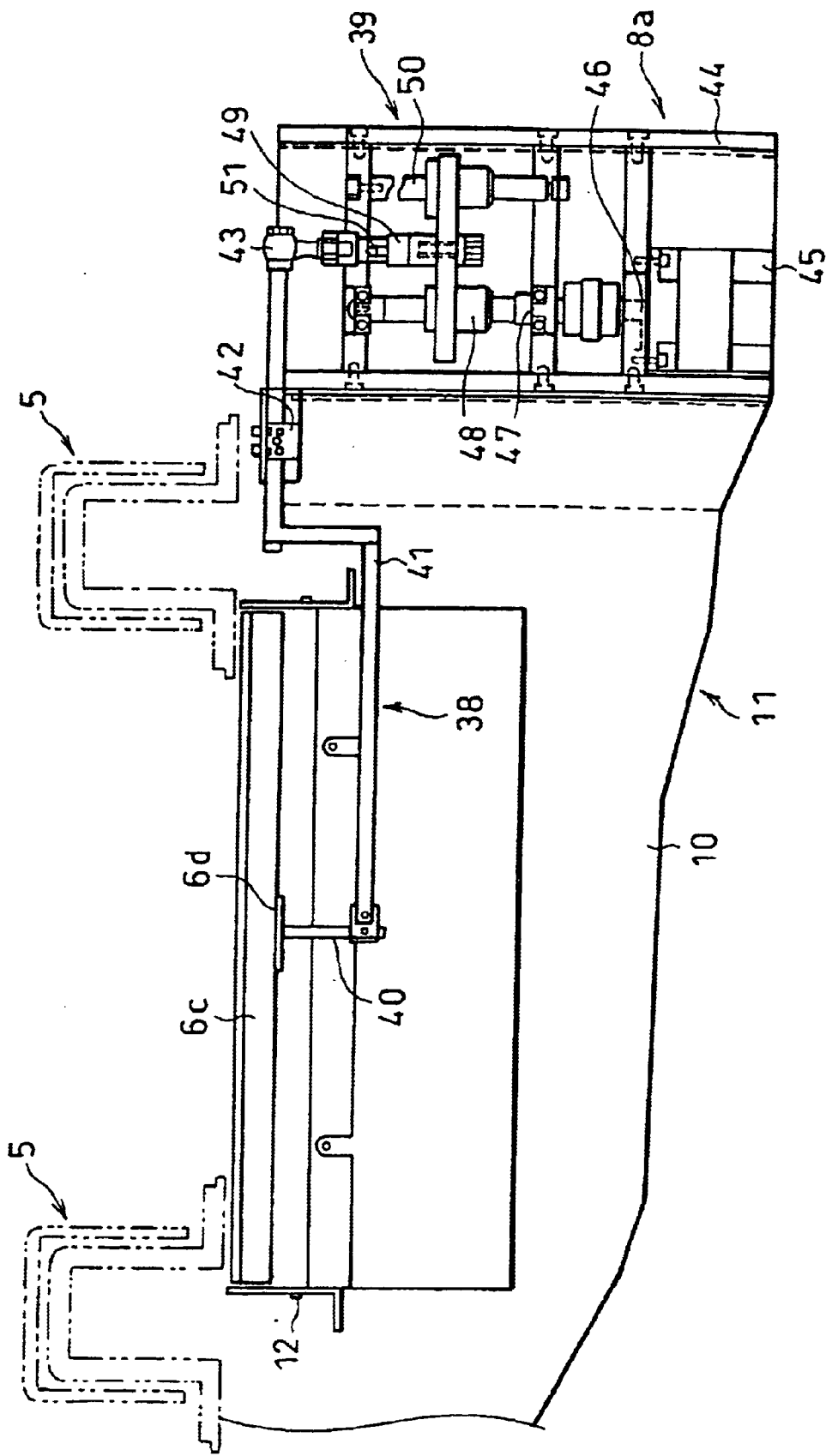
FIG. 5 shows the construction of a solder bath including a front former drive of a soldering apparatus of the first preferred embodiment according to the present invention.

FIG. 4 and FIG. 5 are schematic diagrams of the solder bath 11 including its drive system of the soldering apparatus according to a first preferred embodiment of the present invention.

In this instance, FIG. 5 represents the schematic diagram of FIG. 4 viewed along arrow B.

As shown in FIG. 4, the soldering apparatus 1 is made up of the solder bath 11 for accumulating solder 10, the secondary jet-stream nozzle 2 housed therein, adjustment control means 3 for controlling the secondary jet-stream nozzle 2, and conveying means 5 for conveying the mounted substrate 4.

The secondary jet-stream nozzle 2 includes a fillet up type having a front former 6 and a rear former 7, while the adjustment control means 3 is composed of a drive 8 and control means 9.

The drive 8 consists essentially of a front former drive 8a driving the front former 6 and a rear former drive 8b driving the rear former 7.

The control means 9 in a first preferred embodiment employs a personal computer (hereinafter referred to as "PC") 9a and a control 9b controlling the drive, comprising a system of driving and controlling the drive 8 via remote operation.

Also, as shown in FIG. 4, a camera 15 is disposed in the soldering apparatus 1 for monitoring the condition of the solder bath 11, the jet-stream status of the secondary jet-stream nozzle 2, and the soldering conditions of the mounted substrate 4. The camera 15 is connected to the control means 9 and controlled thereby.

First, the construction of every section/portion of the soldering apparatus 1, including the foregoing principal structural elements, will be described below.

The solder bath 11 is made up of a container having a structure shown in FIG. 4, so formed that solder 10 is accumulated therein as described above and solder 10 goes in and out via a pump (not shown).

In this solder bath 11, the nozzle body 2a of the secondary jet-stream nozzle 2 is fixed as shown in FIG. 4, and the front former 6 and the rear former 7 being set up before and after an opening above the nozzle body 2a.

Figure 6:
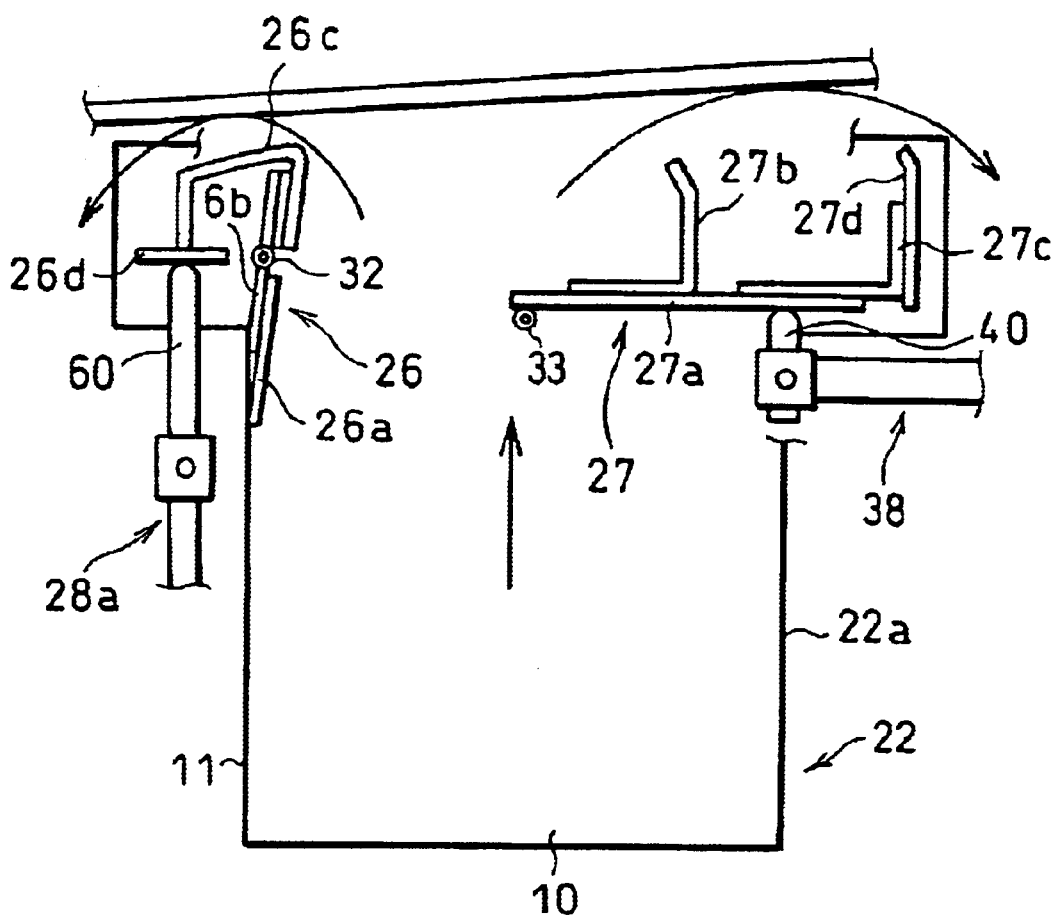
FIG. 6 shows a detailed structure of a jet-stream nozzle of a soldering apparatus of the first preferred embodiment according to the present invention.

FIG. 6 is an enlarged view for describing the details of the structure of the front former 6 and the rear former 7 of the solder bath 11.

The front former 6 includes a lower front nozzle wall 6a set upright at a slight slant and an extension wall 6c curved in a reverse U shape, one end side of which is linked to the lower front nozzle wall 6a via a flat plate-shaped carry-over wall 6b.

In approximately the center of the carry-over wall 6b, a front support shaft 12 is supported by the nozzle body 2a side, the front former 6 being rotatably supported relative to the front support shaft 12.

A flat support plate 6d is affixed to the extended end of the extension wall 6c.

The top side of the extension wall 6c is formed in a reverse U shape at a slight slant and disposed in proximity to the mounted substrate 4.

The rear former 7 is made up of a horizontal wall 7a, one end of which is linked to the rear support shaft 13 supported by the nozzle body 2a side, and the other end side of which stretches along the approximately horizontal direction, a first upper rear nozzle wall 7b which is set upright and affixed to above the horizontal wall, and a second upper rear nozzle wall 7d which is set upright to an L-shaped member 7c affixed to the horizontal wall 7a and which is provided in parallel at an appropriate spacing with the first upper rear nozzle wall 7b.

Note that the upper end of the first upper rear nozzle wall 7b is slightly slanted, its upper end being disposed in a position proximate to the mounted substrate 4.

Next, the rear former drive 8b shown in FIG. 4 will be described in detail.

The rear former drive 8b is made up of a pressure lever 18, a drive mechanism 19 or the like.

The pressure lever 18 is composed of a pressure rod 20 with its curved portion in abutment with the underside of the horizontal wall 7a of the rear former 7, and a lever-shaped member 21 affixed to one end side of the pressure rod 20 or the like.

The middle portion of the lever-shaped member 21 is supported by a support bracket 2a affixed to the nozzle body 22a side of the secondary jet-stream nozzle 2, and to its other end is linked a coupling 23 of the drive mechanism 19.

The drive mechanism 19 is constituted by a body case 24 affixed to the nozzle body 2a side, a motor 25 housed therein, a female screw shaft 28 which screws onto a screw shaft 27 of a motor shaft 26 side, a joint shaft 29 to be linked to the female screw shaft 28 and, a guide shaft 30 or the like. It has to be noted that the coupling 63 is linked to the joint shaft 29. Also, the motor 25 is linked to the control means 9 and controlled thereby.

In the rear former drive 8b according to the construction described above, when the motor 25 is driven, the female screw shaft 28 screwed onto the screw shaft 27 of the motor shaft 26 side turns vertically along said screw shaft 27, and the joint shaft 29 linked to the female screw shaft 28 turns vertically accordingly.

In this vertical movement, the vertical posture of the female screw shaft 28 and the joint shaft 29 is guided vertically by a guide shaft 30, thereby enabling smooth movement.

And, in line with the vertical movement of the joint shaft 29, the coupling 23 linked to the joint shaft 29 also carries out the vertical movement following the joint shaft 29. In this instance, the joint shaft 29 is the type having a ball joint 31, and the coupling 23 can move along the approximately vertical direction without difficulty.

As a result of this movement of the coupling 23, the lever-shaped member 21 performs a lever movement with the support bracket 22 as its fulcrum, thereby moving the pressure rod 20 vertically.

And, following this vertical movement of the pressure rod 20, depending on the position of the pressure rod 20 vertically, the horizontal wall 7a of the rear former 7 turns with the rear support shaft 13 as its center.

Next, the front former drive 8a shown in FIG. 5 will be described in detail.

The former drive 8a is made up of the pressure lever 38, the drive mechanism 39 for operation thereof or the like.

The pressure lever 38 is composed of a pressure rod 40 abutting its round portion to the underside of the support plate 6d of the front former 6, the lever-shaped member 41 affixed to one end side of this pressure rod 40 or the like.

The middle portion of the lever-shaped member 41 is supported by a support bracket 42 affixed to the nozzle body 2a side of the secondary jet-stream nozzle 2, and to its other end is linked the coupling 23 of the drive mechanism 19.

The drive mechanism 19 comprises a body case 24 affixed to the nozzle body 2a side, a motor 45 housed therein, a female screw shaft 48 which screws onto a screw shaft 47 of a motor shaft 46 side, a joint shaft 49 to be linked to the female screw shaft 48, a guide shaft 30, or the like. Note that the coupling 23 is linked to the joint shaft 49. Also, the motor 65 is linked to the control means 9 and controlled thereby.

In the front former drive 8a according to the construction described above, when the motor 45 is driven, the female screw shaft 48 screwed onto the screw shaft 47 of the motor shaft 46 side turns vertically along the screw shaft 47, and the joint shaft 49 linked to the female screw shaft 48 turns vertically accordingly.

In this vertical movement, the vertical posture of the female screw shaft 48 and the joint shaft 49 is guided by the guide shaft 30 in the vertical direction, thereby enabling smooth movement.

And, in accordance with the vertical movement of the joint shaft 49, the coupling 43 linked to the joint shaft 49 also carries out the vertical movement following the joint shaft 49. In this instance, the joint shaft 49 is the type having a ball joint 51 and the coupling 43 can move along the approximately vertical direction without difficulty.

As a result of this movement of the coupling 43, the lever-shaped member 41 performs a lever movement with the support bracket 42 as its fulcrum, thereby moving the pressure rod 40 vertically.

And, following this vertical movement of the pressure rod 40, depending on the position of the pressure rod 40 vertically, the front former 6 turns with the front support shaft 12 as its center.

Figure 7:
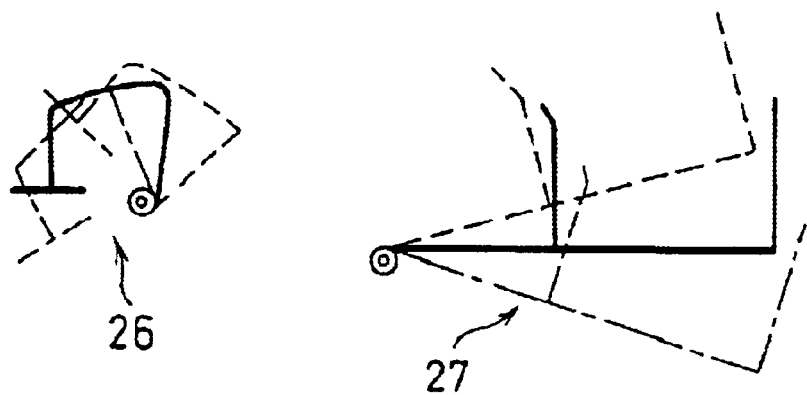
FIG. 7 is a schematic diagram for explaining the condition of the jet-stream nozzle control when applying a soldering process according to the first preferred embodiment of the present invention.

FIG. 7 shows the movements of the front former 26 and the rear former 27.

The front former 26 and the rear former 27 depicted in the solid line positions in FIG. 7 shift to the position above the dotted line or to the position below the dash and dotted line as the pressure rods 20 and 40 turn vertically.

As mentioned above, the front former 26 and the rear former 27 includes a front support shaft 32 and a rear support shaft 33 at positions away from the pressure points of the pressure rods 60 and 40, and the front former 26 and the rear former 27 turn at the basic points of the front and rear support shafts 32 and 33.

Consequently, the front former 26 and the rear former 27 shifted to the positions indicated by the solid lines and the dash and dotted lines are different from the postures of the front former 26 and the rear former 27 shown in solid lines and assume a posture in which it can turn.

As a result, the positions and the angles of the front former 26 and rear former 27 relative to the mounted substrate 4 are in a different status from the solid line status.

From the foregoing, it is possible to control the positions and angles of the front former 26 and the rear former 27 relative to the mounted substrate 4 in any arbitrary status.

Figure 1:
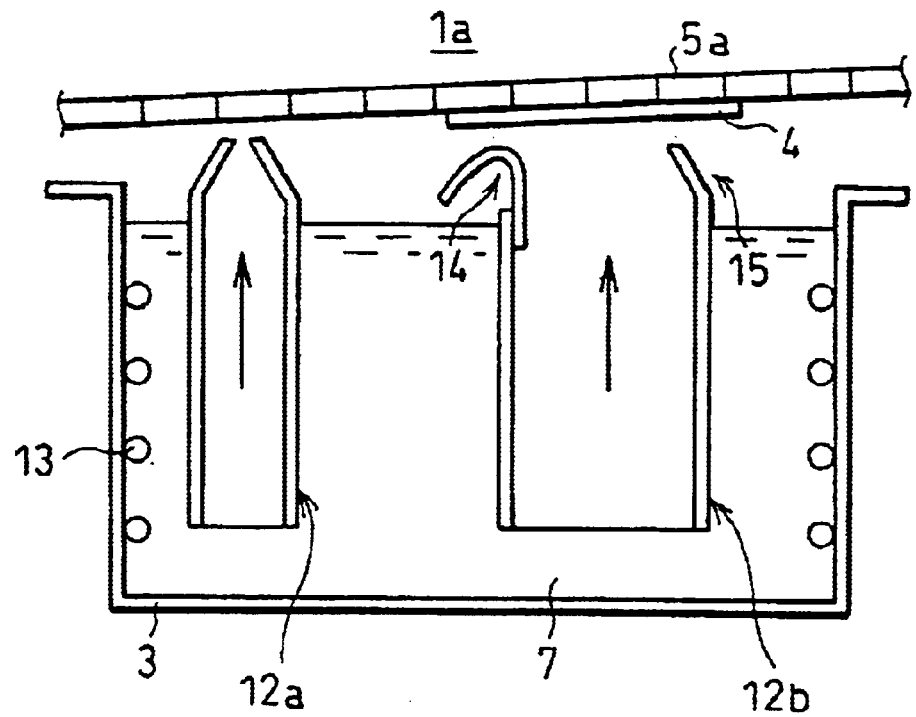
FIG. 1 is a schematic diagram showing the construction regarding a conventional solder bath and jet-stream nozzles.
Figure 2:
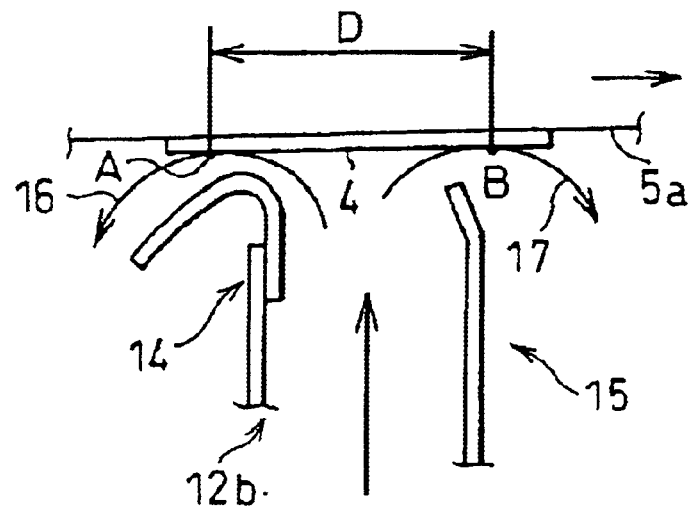
FIG. 2 is a schematic diagram of a jet-streaming condition created by a conventional jet-stream nozzle.

In this way, by setting/changing the positions and angles of the front former 26 and the rear former 27 relative to the mounted substrate 4, length D of the DIP length described in FIG. 2 in connection with the Related Art varies, so that it is possible to control online the soldered results of the mounted substrate 4 to the optimum status.

Figure 8:
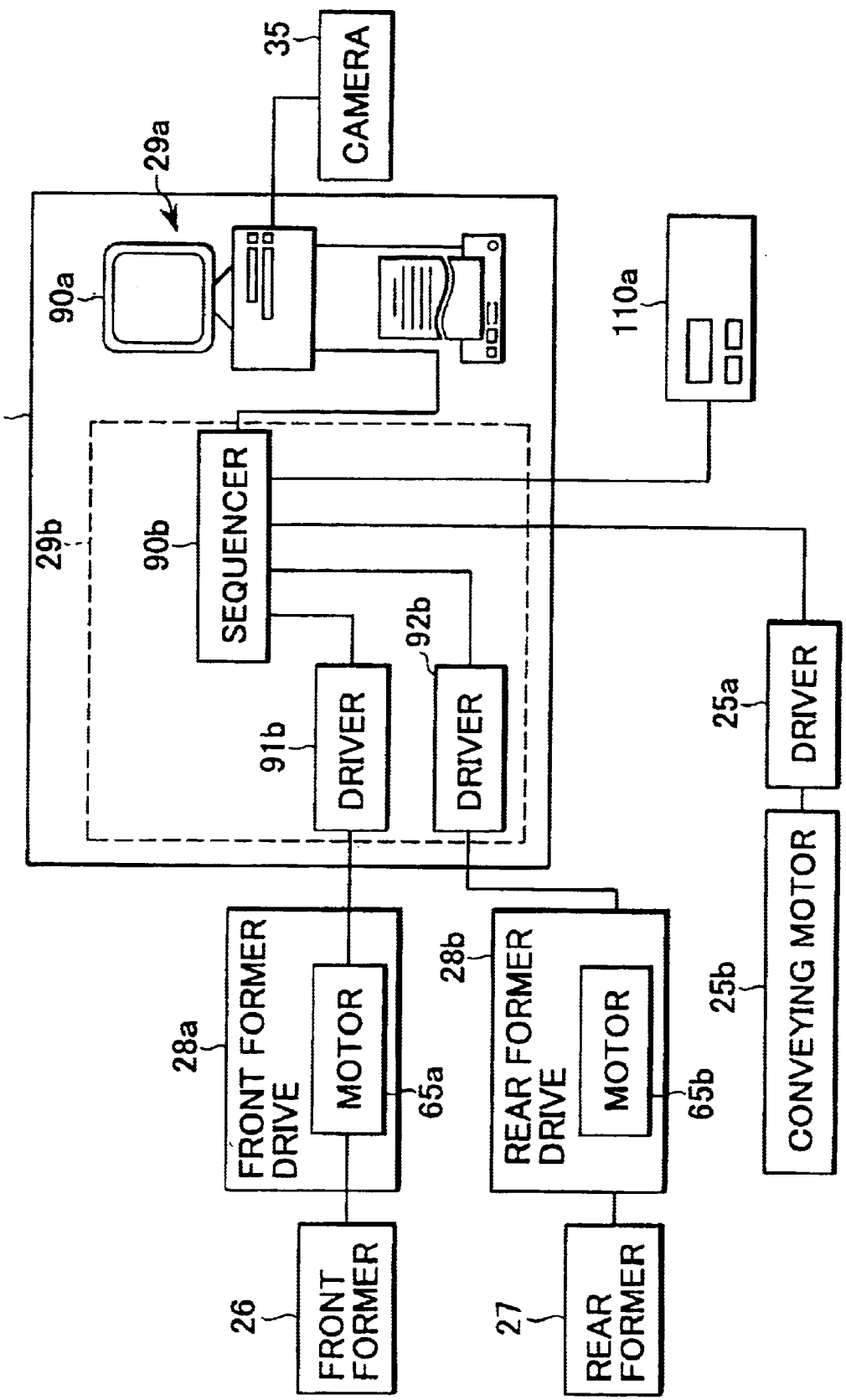
FIG. 8 is a block diagram showing a system of drive and control means of a soldering apparatus of the first preferred embodiment according to the present invention.

FIG. 8 is a block diagram showing a system including the control means 9 for controlling the drive 8 of the soldering apparatus 1.

The control means 29, for example, is made up of a control 29b and a PC 29a controlling the drive system of each section of the soldering apparatus 1, the control 29b further including a sequencer, and drivers 91b and 92b which carry out data exchange.

The PC 29a and the control 29b are known, but the optimum values to control the soldering apparatus under optimum conditions are inputted beforehand into the PC 29a and the control 29b.

Optimum values are inputted into PC 29a and stored as the control contents of the soldering apparatus 1, for example, the positions and angles or the like of the front former 26 and the rear former 27 of the secondary-jet-stream nozzle 2 in addition to the conveying speed, flux specific gravity, preheater temperature, solder temperature, profile or the like appropriate for each mounted substrate 4. Also, in the PC 29a are inputted and stored the control and control method of the camera 35 for monitoring the soldering results.

Further, the PC 29a is connected to the camera 35, so that images acquired thereby can be observed by a monitor 90a of the PC 29a.

The sequencer 90b outputs control signals for controlling various drive systems of the apparatus corresponding to various soldering conditions inputted from the PC 29a. For instance, the sequencer 90b, when the positional conditions of the front former 26 and the rear former 27 are inputted from the PC 29a, based on the signals, outputs control signals corresponding to the positional conditions to drivers 91b and 92b.

The drivers 91b and 92b, according to the control signals, feed drive signals for resolving the desired number of revolutions to the motor 65a of the front former drive 28a and the motor 65b of the rear former drive 28b. Accordingly, as the motors of the drives 28a and 28b of the front and rear formers revolve for the desired number of revolutions, the front former 26 and the rear former 27 operate according to the aforementioned principle.

It has to be noted that as other control signals, the sequencer 90b outputs the control signals inputted from the PC corresponding to the conveying speed to the driver 25a connected to the conveying motor 25b used for the conveying means 5, such as the conveyor, whereas, upon receiving the signals, the driver 25a sends the drive signals corresponding to the conveying speed to the conveying motor 25b for conveying, thus carrying the mounted substrate 4 at the desired conveying speed.

Also, with an input of the detection value of the flux specific gravity from the flux specific-gravity meter 110a, which measures the flux specific gravity to be used by the flux coating unit 110, the sequencer 90b outputs the detection value to the PC 90a for storage in the memory means (not shown) in the PC 29a.

As described above, for the soldering conditions by the soldering apparatus 1, for example, the positions, angles or the like of the front former 26 and the rear former 27 of the secondary jet-stream nozzle 2 are inputted and stored in the PC 29a, and when various conditions stored are used again, said data is outputted to the sequencer 90b to enable the soldering process to be applied according to the reproducible soldering conditions.

The control program of the soldering conditions for executing control of the soldering conditions mentioned above is stored in the memory means (not shown) in the PC 29a, and when executing it, it is read out by the main memory and executed by the CPU. As the memory means therefor, for instance, magnetic memory devices or the like, such as a hard disk and a floppy disk are used.

Next, specific examples of when the control program of the soldering conditions by the PC 29a is executed will be described.

Figure 9:
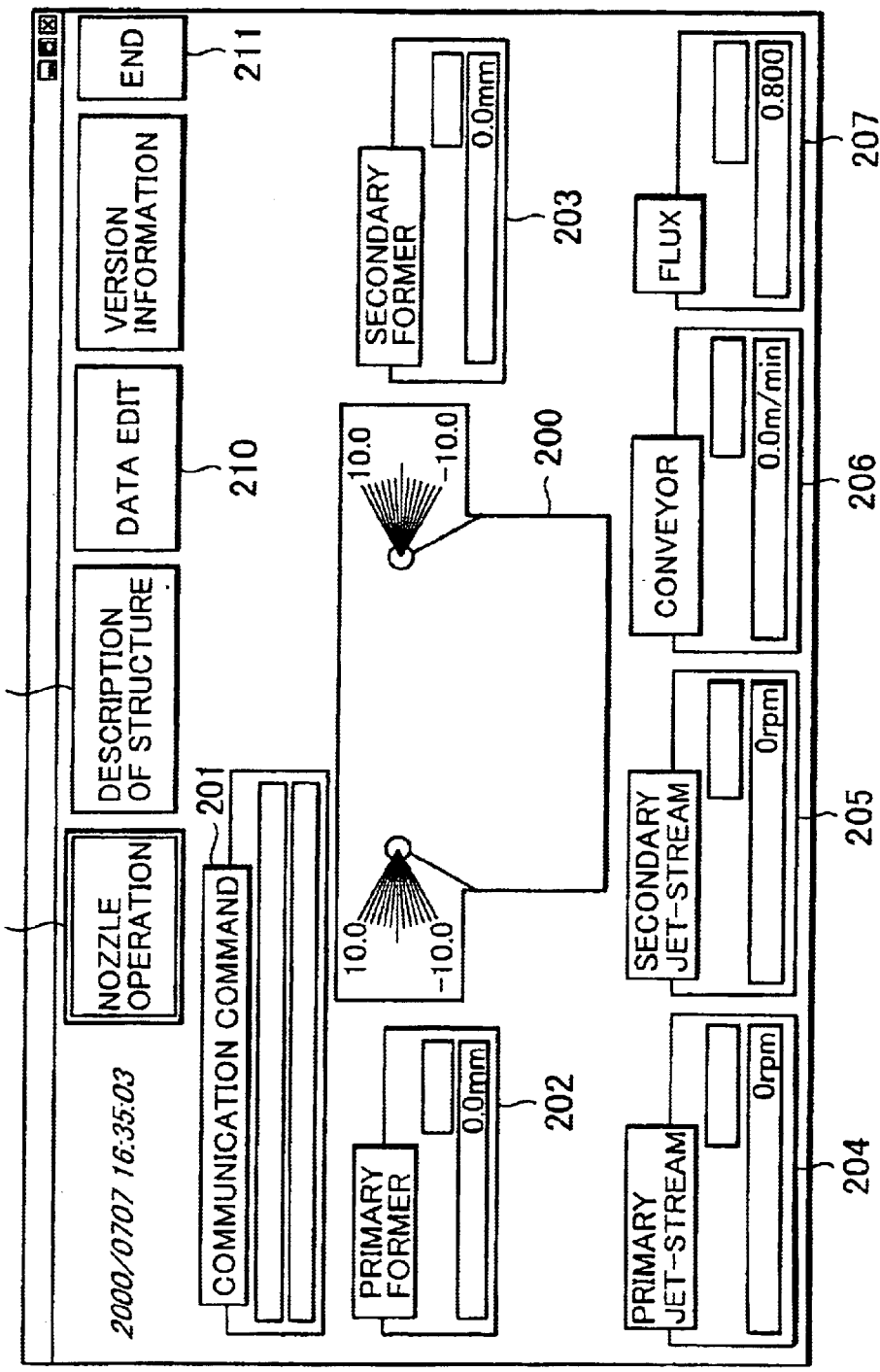
FIG. 9 is a view showing an example of a nozzle adjustment screen displayed on the monitor of a personal computer used for a soldering apparatus of the first preferred embodiment according to the present invention.

When the control program of the soldering conditions is executed, the screens shown in FIG. 9 are displayed in the monitor 90a of the PC 29a, whereby the engineer controls the soldering conditions by using input means such as key plate and mouse.

FIG. 9 shows an example of a Nozzle Adjustment screen, which is displayed on the monitor 90a of the PC 29a. The screen shown in FIG. 9 is so designed that the items of various soldering conditions are inputted online from the sequencer 90b and can be monitored.

As shown in FIG. 9, the Nozzle Adjustment screen has a Nozzle Position indicator 200, a Communication Command indicator 201, a Primary Former indicator 202, a Secondary Former indicator 203, a Primary Jet-Stream RPM indicator 204, a Secondary Jet-Stream RPM indicator 205, a Conveyor Speed indicator 206, and a Flux Specific Gravity indicator 207 for the display portion, as well as a Nozzle Operating button 208, a Description of Structure button 209, a Data Edit button 210, and an End button 211 for the operating buttons.

The Nozzle Position indicator 200 graphically displays the current positions of the primary former (front former) and the secondary former (rear former) from their origins. In the Nozzle Position indicator 200, there are provided respectively many lines in the positive direction and the negative direction from the origins, and of such many lines, those lines corresponding to the current positions of the primary former (front former) and the secondary former (rear former) are shown in different colors to facilitate identification.

The Communication Command indicator 201 displays the communication status with the sequencer 90b. When the values therein change, it shows that communication is normal.

The Primary Former indicator 202 displays the position of the primary former (front former) from its origin. In this case, the position of the front former 26 from its origin means that, for example, 0 (origin) is set in FIG. 4 when the front support shaft 32 and the support plate 26c are parallel, indicating a value as to how far the horizontal wall 26d shifted from the position of origin in a vertical direction by means of the pressure rod 60.

The Secondary Former indicator 203 displays the position of the secondary former (rear former) from its origin. In this case, the position of the rear former 27 from its origin means that, for example, 0 (origin) is set in FIG. 4 when the rear support shaft 33 and the horizontal wall 27a are parallel, indicating a value as to how far the horizontal wall 27a shifted from said position of origin in a vertical direction by means of the pressure rod 60.

The Primary Jet-Stream RPM indicator 204 displays the current number of revolutions of the pump jetting out streams of molten solder from the primary jet-stream nozzle 101 shown in FIG. 3. The Secondary Jet-Stream RPM indicator 205 displays the current number of revolutions of the pump jetting out streams of molten solder from the secondary jet-stream nozzle 2 shown in FIG. 3.

The Conveyor Speed indicator 206 displays the current value of the speed of a conveyor constituting the conveying means 5 shown in FIG. 3.

The Flux Specific Gravity indicator 207 displays the current value of the flux specific gravity inputted from the specific gravity value of flux meter 110a shown in FIG. 8.

The Nozzle Operating button 208 displays the Nozzle Operating screen (to be explained later) once the button is selected by clicking or other means.

The Description of Structure button 209 displays the Nozzle Photograph Explanatory screen when the button is selected by clicking, for example.

The Data Edit button 210 displays a Data Edit screen (explained later) when the button is selected by clicking or the like.

The End button 211 is used for terminating display.

Figure 10:
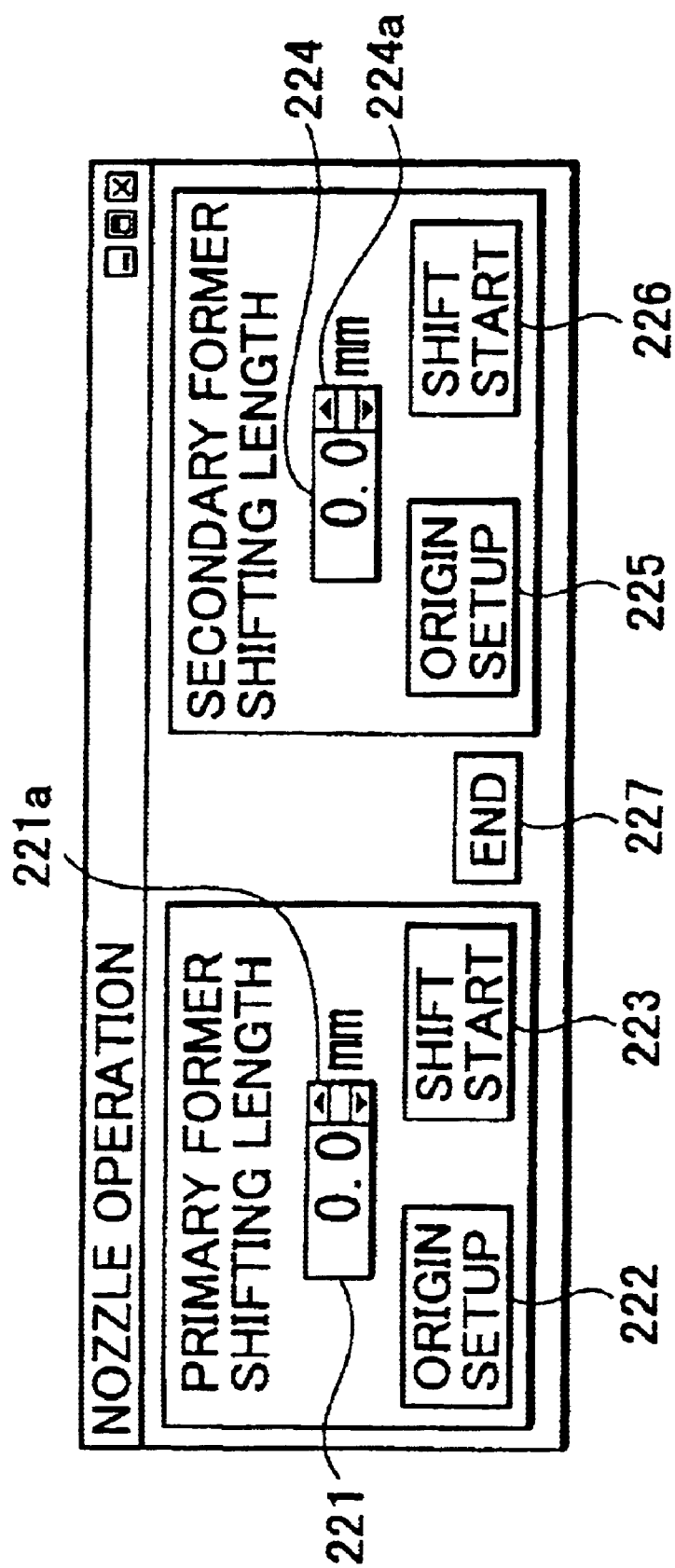
FIG. 10 is a diagram showing an example of a nozzle operating screen displayed on the monitor of a personal computer used for a soldering apparatus of the first preferred embodiment according to the present invention.

FIG. 10 gives an example of a Nozzle Operating screen to be displayed by selecting the foregoing Nozzle Operating button 208. As shown in FIG. 10, a broad classification is made on the Nozzle Operating screen for the setting of the shifting length of the primary former and the shifting length of the secondary former.

For tools to shift the position of the primary former (front former 26), an Input box 221, an Origin Setup button 222, and a Shift Start button 223 are provided.

The Input box 221 is used when changing the current position of the primary former (front former), with the shifting length shown therein corresponding to the number of clicks of the Operating button 221.

In this case, in the Input box 221, the shifting length of the primary former in the vertical direction can be modified by ±10 mm, and the minimum variable unit is, for example, 0.1 mm.

The Origin Setup button 222 is used when shifting the primary former (front former) to the position of its origin.

The Shift Start button 223 operates so that when it is executed after changing the input value, the front former illustrated in the Nozzle Position indicator 200 shown in FIG. 9 shifts to the predetermined position, while, at the same time, the front former actually makes a shift as instructed.

For tools to shift the position of the secondary former (rear former 27), an Input box 224, an Origin Setup button 225, and a Shift Start button 226 are provided.

The Input box 224 is used when changing the current position of the secondary former (rear former), with the shifting length shown therein corresponding to the number of clicks of the Operating button 224a.

In this case, in the Input box 224, the shifting length of the secondary former in the vertical direction can be modified by 10 mm, and the minimum variable unit is, for example, 0.1 mm.

The Origin Setup button 225 is used when shifting the secondary former (rear former) to the position of its origin.

The Shift Start button 226 operates so that when it is executed after changing the input value, the rear former illustrated in the Nozzle Position indicator 200 shown in FIG. 9 shifts to the predetermined position, while, at the same time, the rear former actually makes a shift as instructed.

An End button 227 is used when terminating the Nozzle Operating screen. By executing this button, the screen returns to the Nozzle Adjustment screen shown in FIG. 9.

FIG. 11A shows an example of a Data Edit screen displayed by selecting the Data Edit button 210 shown in FIG. 9.

As shown in FIG. 11A, the Data Edit screen includes as its data input section a Measuring Date Input box 231, a Measuring Person Input box 232, a Machine Code Input box 233, a Substrate Code Input box 234, a Primary Former Input box 235, a Secondary Former Input box 236, a Primary Jet-Stream RPM Input box 237, a Secondary Jet-Stream RPM Input box 238, a Conveyor Speed Input box 239, and a Flux Specific Gravity Input box 240.

Of the foregoing input boxes, the input boxes 235 to 240 basically indicate the soldering conditions displayed in the Nozzle Adjustment screen shown in FIG. 9 when the Date Edit screen is opened. Note that, at this time, it is possible to revise each data value shown in each of the display boxes 235 to 240 when editing.

Also, when the past file is opened, each soldering condition therein is displayed.

The date of soldering according to the soldering conditions is inputted to the Measuring Date Input box 231.

The name of the person who performed the soldering process using the soldering apparatus 1 or the like is inputted to the Measuring Person Input box 232.

The machine code of the apparatus on which the mounted substrate 4 to be soldered is loaded is inputted to the Machine Code Input box 233.

The substrate code of the mounted substrate to be loaded on the predetermined machine is inputted to the Substrate Code Input box 234.

The Primary Former Input box 235 is where the position of the primary former (front former) from its origin is to be inputted, and when the Data Edit screen is open, the value shown in the Primary Former indicator 202 of the Nozzle Adjustment screen previously shown in FIG. 9 is displayed.

The Secondary Former Input box 236 is where the position of the secondary former (front former) from its origin is to be inputted, and when the Data Edit screen is opened, the value shown in the Secondary Former indicator 203 of the Nozzle Adjustment screen previously shown in FIG. 9 is displayed.

The Primary Jet-Stream RPM Input box 237 is where the number of revolutions of the pump for jetting out in stream the molten solder from the Primary Jet-Stream nozzle 101 is to be inputted, and when the Data Edit screen is opened, the value shown in the Primary Jet-Stream RPM indicator 204 of the Nozzle Adjustment screen previously shown in FIG. 9 is displayed.

The Secondary Jet-Stream RPM Input box 238 is where the number of revolutions of the pump for jetting out in stream the molten solder from the Secondary Jet-stream nozzle 22 is to be inputted, and when the Data Edit screen is opened, the value shown in the Secondary Jet-Stream RPM indicator 205 of the Nozzle Adjustment screen previously shown in FIG. 9 is displayed.

The Conveyor Speed Input box 239 is where the speed of the conveyor constituting the conveying means 5 is inputted, and when the Data Edit screen is opened, the value shown in the Conveyor Speed indicator 206 of the Nozzle Adjustment screen previously shown in FIG. 9 is displayed.

The Flux Specific Gravity Input box 240 is where the flux specific gravity value is to be inputted, and when the Data Edit screen is opened, the value shown in the Flux Specific Gravity indicator 207 of the Nozzle Adjustment screen previously shown in FIG. 9 is displayed.

When the Edit button 241 shown in FIG. 11A is clicked and selected for the menu bar, as shown in FIG. 11B, an Edit-Batch Reading of Monitor Values button is displayed, and the Edit-Batch Reading of Monitor Values button is used when displaying the currently displayed data.

When the File button 242 shown in FIG. 11A is clicked and selected for the menu bar, as shown in FIG. 11C, a File-Open button 243, a File-Override Save button 244, a File-Naming Save button 245, a File-Print button 246, and a File-End button 247 are displayed.

The File-Open button 243 is used when opening the past file.

The File-Override button 244 is used when overriding and saving the currently displayed data under the same file name.

The File-Naming save button 245 is used when newly saving the currently displayed data.

The File-Print button 246 is used when printing the currently displayed data.

The File-End button 247 is used when terminating the screen.

Next, the method of operating the soldering apparatus of a first preferred embodiment according to the foregoing construction will be described with reference to the flow-chart shown in FIG. 12.

First, in step ST1, the mounted substrate 4 is soldered by the soldering apparatus 1 under predetermined conditions. For the predetermined soldering conditions, the conveying speed of the conveying means 5, preheater temperature, and solder temperature are, for example, set corresponding to the kind of the mounted substrate, the solder material to be used, the specific gravity of solder to be used, and other factors. Another step includes setting the positions of the front former 26 and the rear former 27 of the secondary jet-stream nozzle 2 that are considered appropriate by the PC 29a, and the soldering process is performed based on these set conditions.

Next, in ST2, confirmation is made of the soldering results of the mounted substrate 4 subjected to soldering under the foregoing conditions. The soldering results confirmation includes checking via the monitor 90a of the PC 29a the images acquired by the camera 35 that takes pictures of the jet-streaming condition of the solder and the soldering result of the mounted substrate 4.

With regard to the soldering process applied to the mounted substrate 4 mentioned above, for example, in the case of many occurrences of faulty bridges, the following corrective action will be required. Many bridge failures mean that the molten solder fully supplied from the primary jet-stream nozzle 101 is not completely removed by the secondary jet-stream nozzle 2, and, therefore, wherefore, to further remove the molten solder, it is necessary, at the secondary jet-stream nozzle 22 to reduce the flow rate of the molten solder which is especially jetting out in a stream from the rear former 27 side. Accordingly, in the succeeding steps, an operation to push the position of the rear former 27 upward is performed to decrease the flow rate.

Namely, in step ST3, first, the Nozzle Adjustment screen shown in FIG. 9 is displayed on the monitor 90a of the PC 29a and the current soldering results are checked, and thereafter the Nozzle Operating button 208 is selected to bring out the Nozzle Operating screen shown in FIG. 10.

Next, in step ST4, the figure in the Input box 224 is entered in the positive direction by using the Operating button 224a for adjusting the secondary former's (rear former) shifting length and the Shift Start button is clicked.

At this time, the nozzle position in the Nozzle Position indicator 200 on the Nozzle Adjustment screen shown in FIG. 9 moves in the positive direction for the length of the inputted figure. At the same time, the control signal corresponding to the specified nozzle position is outputted from the PC 29a to the sequencer 90b, which outputs the control signal corresponding to the specified position to the driver 92b, which in turn supplies the drive signal corresponding to the shifted position to the motor 25 of the rear former drive 8b, thereby causing the rear former 27 to turn upward for the length of the inputted figure.

The upward turning of the rear former 27 results in reducing the flow rate of the molten solder jetting out stream from the rear former 27 side, contributing to improving solder removal from the mounted substrate 4, and thus minimizing bridge failure.

Next, for recording the soldering conditions, the display is shifted to the Data Edit screen shown in FIG. 11, and the soldering conditions are inputted.

The input conditions at this time, as shown in FIG. 11, include, for example, the date of measurement, the person who made measurement, the machine code, the substrate code, the position (mm) of the primary former (front former 26), the position (mm) of the secondary former (rear former 27), the number of revolutions of the pump for the primary jet-stream nozzle 101, the number of revolutions of the pump for the secondary jet-stream nozzle 2, the flux specific gravity and other items.

After following the foregoing procedures, the soldering conditions are recorded, and if it is considered that the reference values may be provided for the next soldering conditions or the soldering conditions may be the optimum, the same soldering conditions can be reproduced for the next soldering process.

As described above, according to the soldering apparatus of the first preferred embodiment, the heights of the front and rear formers 26 and 27 of the secondary jet-stream nozzle can be varied in units of 0.1 mm by means of the PC 29a, thus facilitating the micro-adjustments of the front and rear formers 26 and 27 thereof. Another advantage and feature of the soldering apparatus of the preferred embodiment of the present invention is that since nozzle adjustments using the PC 29a are possible, any nozzle adjustment can be accomplished while the mounted substrate 4 is moving on the line, and therefore, it is possible to achieve optimum nozzle conditions in a short time with good accuracy.

Reproducibility of optimum soldering conditions is a further improvement. Inasmuch as the soldering conditions, together with the nozzle conditions, can be inputted to the PC 29a per substrate, for example, once the optimum conditions are obtained, these optimum conditions can be accessed later and reproduced.

Moreover, because of the simplification of the nozzle positional adjustments rendered by using the PC 29a there is an additional advantage in that any inexperienced operator, irrespective of age or sex, can carry out the soldering process so as to achieve similar levels of quality, thus contributing to improving operating efficiency.

In addition, by recording the critical soldering conditions, together with the nozzle conditions, per substrate, it is possible to cope with any machine change of the soldering apparatus in short time.

Relatively low-cost implementation also is a benefit accrued from the soldering apparatus of the foregoing construction.

Moreover, using the camera 35 to take images of the jet-streaming condition of the jet-stream nozzle, as well as monitoring by the PC 29a, enables the soldering results to be checked online, whereby control so as to achieve optimum conditions can be performed more accurately.

Second Embodiment

In the first preferred embodiment of the present invention described above, a description was made by taking an example of an operator stationed in the vicinity of the soldering apparatus with the PC 29a used for controlling the soldering conditions. In a second preferred embodiment, a description will be made by taking an example of controlling the soldering conditions in a location remote from the soldering apparatus 1.

Figure 13:
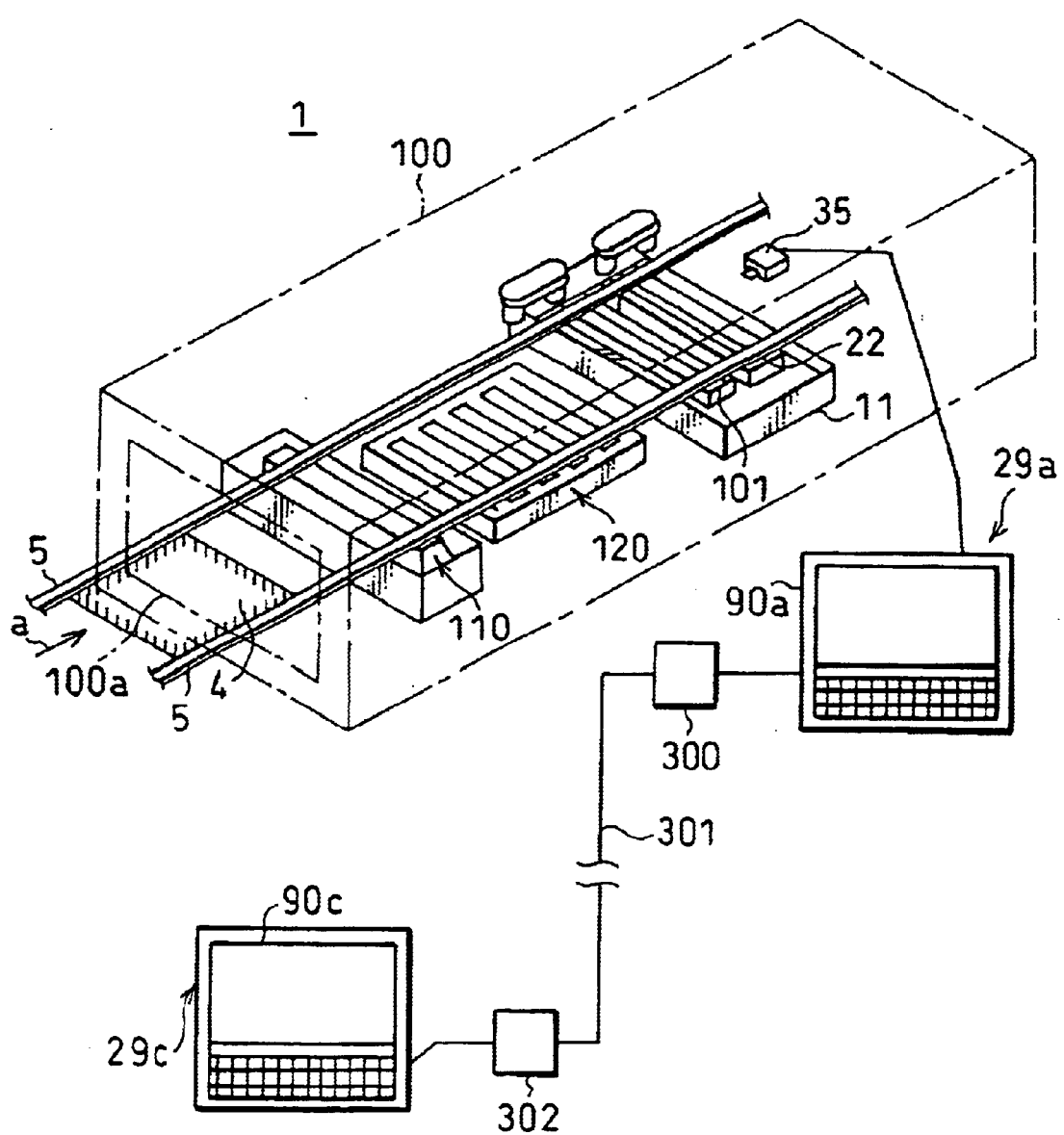
FIG. 13 is a diagram showing the construction of a principal section of a soldering apparatus of a second embodiment according to the present invention.

FIG. 13 is a schematic representation of the soldering apparatus of a second preferred embodiment. It is to be noted that the same reference numbers are used for those portions having similar functions as the first preferred embodiment in the drawing, and no repeat explanation is made.

As shown in FIG. 13, the soldering apparatus 1 of the second preferred embodiment, in the same way as the first preferred embodiment, includes a conveying means 5, a flux coating unit 110, a preheater 120, and a solder bath 11, and a camera 35 is set up in a predetermined position to catch images of the jet-streaming condition of the molten solder from a primary jet-stream nozzle 101 and a secondary jet-stream nozzle 22 of the solder bath 11, with the camera 35 and a PC 29a being mutually connected to enable a monitor 90a of the PC 29a to monitor the images caught by the camera 35.

The construction described above is the same as that of the first preferred embodiment. For the sake of simplifying the drawing, the cooler 130 and the cleaning unit 140 shown in FIG. 3 in the first preferred embodiment are omitted.

Note that in the PC 29a, in the same way as the first preferred embodiment, a sequencer 90b and other devices are connected as shown in FIG. 8, and each construction in the drawings from FIG. 3 to FIG. 11 explained in the first preferred embodiment is the same for the second preferred embodiment.

In this embodiment, a circuit connection device 300 for connecting the PC 29a to the communication network 301 is further connected to the PC 29a. Also, there is a PC 29c for remote operation in a remote location, which is connected to the communication network 301 via the circuit connection device 300.

As described in the first preferred embodiment of the present invention, the PC 29a is to be disposed in the vicinity of the soldering apparatus 1; and, for the second embodiment, in addition to the functions described in the first preferred embodiment, a control signal is outputted to the sequencer 90b shown in FIG. 8 based on the signals inputted from the circuit connection device 300.

Also, the PC 29a, as described above, is connected to the camera 35, and controls the camera lens aperture or the like in addition to monitoring images from the camera 35.

The circuit connection device 300 at the apparatus side is a known circuit connection device which converts the signal system of the communication network 301 into the signal system of the PC 29a, and which converts signals inputted from the PC 29a as well as jet-stream images or the like of the molten solder from the primary and secondary jet-stream nozzles 101 and 22 to the signal system of the communication network 301, the device being connected to the PC 29a on the apparatus side and the communication network 301.

The communication network 301 is a conventional communication network; for example, it is a public telephone line. Other networks may be used for the communication network 301, e.g., a LAN (Local Area Network) using leased lines, a MAN (Metropolitan Area Network) or a WAN (Wide Area Network).

The circuit connection device 302 converts the signals inputted from the PC 29c for remote operation into the signal system of the communication network 301 and converts the images of the camera 35 transmitted from the circuit connection device 300 on the apparatus side and the signals from the PC 29a into the signal system of the PC 29c.

The PC 29c for remote operation has the same function as the PC 29a on the apparatus side, displaying on the monitor 90c the images captured by the camera 35 inputted via the communication network 301 and the circuit connection device 302, the soldering conditions set by the PC 29a or the like. The PC 29c for remote operation, in the same way as the PC 29a on the apparatus side, also is capable of displaying the Nozzle Adjustment screen, Nozzle Operating screen, Edit screen shown in FIG. 9 to FIG. 11, respectively.

Operation of the soldering apparatus of the second preferred embodiment according to the above construction will be described with reference to the flowchart of FIG. 14.

First, in step ST11, the operator on the site on which the soldering apparatus is installed applies the soldering process to the mounted substrate 4 by using the soldering apparatus under predetermined conditions.

At this time, under predetermined conditions including the type of the mounted substrate 4, the soldering material to be used and the specific gravity value of flux to be used, the operator on site sets the conveying speed of the conveying means 5, the preheater temperature and the solder temperature, whereupon the proper positions of the front former 26 and the rear former 27 of the secondary jet-stream nozzle 22 are further set by the PC 29a, and then the soldering process is implemented based on the set conditions.

Now, the jet-streaming condition and other factors of the molten solder from the primary jet-stream nozzle 101 and the secondary jet-stream nozzle 22 are in the condition shown by the images thereof acquired by the on-site camera 35, and the soldering process is implemented accordingly.

Now, the image signals of the jet-streaming condition of the molten solder from the primary jet-stream nozzle 101 and the secondary jet-stream nozzle 22, images of which are taken by the camera 35 on the site where the soldering apparatus is installed, are monitored by the monitor 90a of the PC 29a on site and inputted into the circuit connection device 300 on site to be transmitted via the communication network 301 to the circuit connection device 302 in a remote location.

The image signals are outputted from the circuit connection device 302 to the PC 29c for remote operation and displayed on the monitor 90c of the PC 29c for remote operation. Also, the soldering conditions set on the PC 29a are inputted to the circuit connection device 300 on site and transmitted via the communication network 301 to the circuit connection device 302 in the remote location, further being outputted from there to the PC 29c for remote operation to be displayed on the monitor 90c of the PC 29c for remote operation.

It is to be noted that on the monitor 90c, the display of the images from the camera 15 or the display of the current soldering conditions can be changed over by the PC 29c for remote operation.

And in step ST12, the engineer located at a distance remote from the site on which the soldering apparatus is installed, while taking into consideration the current soldering conditions on the Nozzle Adjustment screen shown in FIG. 9 and looking at the jet-streaming condition of the molten solder from the nozzle shown on the monitor 90C of the PC 29c for operation, makes a decision in particular, as to whether or not the positions of the front former 26 and the rear former 27 of the secondary jet-stream nozzle 22 are accurate.

Next, in step ST13, in the event that the jet-streaming condition from the nozzle is not appropriate, the engineer selects the Nozzle Operating button 208 of the Nozzle Adjustment screen shown in FIG. 7 of the PC 90c for remote operation to bring out the Nozzle Operating screen shown in FIG. 8 and, by using the Operating buttons 221a and 224a for adjusting the shifting length for the primary former (front former 26) or the secondary former (rear former 27), inputs a figure for the necessary length of shift in the Input box 221 and 224, and then clicks the Shift Start button.

At this event, on the monitor 90c of the PC 29c for remote operation, the nozzle position in the Nozzle Position indicator 200 on the Nozzle Adjustment screen shown in FIG. 9 shifts in the positive direction for the inputted length. Then, the control signal corresponding to the specified nozzle position is inputted from the PC 29c for remote operation to the circuit connection device 302 and then transmitted via the communication network 301 to the circuit connection device 300 on site in the remote location, the control signal being outputted from the circuit connection device 300 to the PC 29a.

In step ST14, at the same time, the control signal corresponding to the control contents is outputted from the PC 29a to the sequencer 90b, which outputs the control signal corresponding to the specified position to the drivers 91b and 92b, which in turn supply the drive signal corresponding to the shifted position to the motors 65 and 45 of the front former drive 28a and the rear former drive 51b, thereby causing the front former 26 or the rear former 27 to turn upward or downward for the length of the inputted figure.

Next, in step ST15, for recording the soldering conditions on site, the display is shifted to the Data Edit screen shown in FIG. 11, and the input of the soldering conditions is done at this time.

The input conditions at this time, as shown in FIG. 11, include, for example, the date of measurement, the name of the person who made the measurement, the machine code, the substrate code, the position (mm) of the primary former (front former 26), the position (mm) of the secondary former (rear former 27), the number of revolutions of the pump for the primary jet-stream nozzle 101, the number of revolutions of the pump for the secondary jet-stream nozzle 22, the conveyor speed (m/min), the flux specific gravity and other items.

After following the foregoing procedures, the soldering conditions are recorded, and if it is considered on site that the reference values may be provided for the next soldering conditions or the soldering conditions used may be the optimum, the same soldering conditions may be reproduced for the next soldering process.

As described above, according to the soldering apparatus of the second preferred embodiment of the present invention, in addition to the same effects as the first preferred embodiment of the present invention, the following effects can be attained; namely, installation of the camera 35 at a position capable of viewing the jet-streaming condition of the solder and the soldering results of the mounted substrate 4, reading the jet-streaming condition and the solder quality in the on-site PC 29a, and transmission via the communication network 301 of the images, together with the soldering conditions shown in FIG. 9, to the PC 29c in the remote location. These steps make it possible to vary the soldering conditions while viewing the images from a remote distance.

Consequently, even when an inexperienced operator perform the soldering process on the site on which the soldering apparatus is installed, an experienced operator stationed in a remote location is able to operate the nozzle while viewing the jet-streaming condition of the solder and the results of soldering the mounted substrate 4, so that optimum soldering conditions are obtained, and soldering under optimum soldering conditions, is preferred and whereas by recording the nozzle conditions modified at this event in the on-site PC 29a, the next time the soldering is performed under the same conditions, the same soldering conditions can be reproduced without again having to receive instructions from the operator stationed in the remote location.

Further, in the case of soldering apparatuses installed in various locations, by transmitting a soldering conditions for the soldering apparatus installed in a location on which there are many experienced operators stationed to the soldering apparatuses installed in other locations, it is possible to perform the soldering process under the same conditions in various locations, thus eliminating any disparate soldering quality with respect to the same type of substrate caused by soldering apparatuses installed in various locations and contributing to improving the soldering quality.

It is to be understood that the soldering apparatus according to the present invention is not limited to the description of the preferred embodiments, since the present invention can be realized through other embodiments and being practiced or carried out in various other alternative ways. For example, the foregoing preferred embodiments were described in terms of the shape of the end of the secondary jet-stream nozzle 22 that can be turned by the front former 26 and the rear former 27, so that modifications may be made to the optimum condition as the occasion may demand. Nevertheless, the present invention is in no way limited to this. For example, the same mechanism may be set up on the primary jet-stream nozzle 101 to make the shape of the end of the primary jet-stream nozzle 101 turn so as to enable modifications to the optimum condition, as necessary.

It also is to be understood that although the construction of the adjustment control means 3 is based on the foregoing, it is not limited to this example.

Furthermore, it should be understood that the foregoing relates only to preferred embodiments of the present invention, and that it is intended to cover all changes and modifications of the examples of the preferred embodiments of the invention herein described for the purposes of the disclosure, which do not constitute departures from the spirit and scope of the invention. By virtue of installing a plurality of the cameras 35 in various positions which afford more appropriate views of the jet-streaming condition of the solder and the results of soldering the mounted substrate 4, and by virtue of further installing a plurality of monitors capable of displaying respective images from the plurality of cameras, it is possible to set the soldering conditions by the PC 29a while observing the displayed images from the plurality of monitors.

Moreover, while the specific shapes of the front former 26 and the rear former 27 being turned by the drive 8 with reference to the drawings from FIG. 4 to FIG. 6 have been described, the description is by no means limited to this example, and other structures may be used to provide the moving feature.

As it is apparent from the foregoing, the soldering apparatus according to the present invention makes it possible for any inexperienced operator, regardless of age and sex, to carry out timely micro-adjustments of the jet-stream nozzle in a short period of time with good accuracy, thus contributing to enhancing the soldering quality, improving workability, and increasing operating efficiency.

In addition, since the soldering conditions once stored can be reproduced at any time, it is possible for an operator with a relatively low degree of proficiency to apply the process and control, smoothly handling any machine changeover.

Further, by observing the jet-streaming condition of the molten solder, it is possible to carry out timely feedback of the data to the soldering conditions.

Furthermore, inasmuch as remote operation of the positions of the jet-stream nozzle can be performed, even when an engineer with a low degree of proficiency handles the soldering process, soldering can be carried out under the optimum conditions as long as well experienced engineer stationed in a remote location takes charge of operating the nozzle to achieve the optimum soldering results.

Finally, as the configurations and structures of respective units and portions described specifically with respect to the preferred embodiments of the present invention are only examples of the realization of the present invention, the embodiments thereof should not be construed as limiting the technical scope of the present invention, the present invention is not limited to the preferred embodiments described above, thus any variation as well as any combination and/or sub combination of the embodiments is permitted, without departing from the scope of the present invention.

What is claimed is:

1. A soldering apparatus soldering a piece to be soldered by jetting out streams of molten solder accumulated in a-solder bath, said apparatus comprising:
   a nozzle having a movable end and jetting out streams of molten solder of said solder bath;
   a drive means for setting a relative position between said end of said nozzle and said piece to be soldered; and
   control means for providing to said drive means a control signal corresponding to said relative position;
   wherein said nozzle comprises:
      a nozzle body;
      a front former provided on an end of said nozzle body at a location upstream of conveying direction of said piece to be soldered; and
      a rear former provided on an end of said nozzle body at a location downstream of a conveying direction of said piece to be soldered;
      and wherein at least one of either said front former or said rear former can be moved by said drive means receiving said control signal.

2. The soldering apparatus according to claim 1, wherein said drive means comprises a first drive means for setting a position and an angle of said front former in relation to said piece to be soldered.

3. The soldering apparatus according to claim 1, wherein said drive means comprises a second drive means for setting a position and an angle of said rear former in relation to said piece to be soldered.

4. The soldering apparatus according to claim 1, further comprising:
   an image processing means for acquiring an image of jet-streaming of-molten solder from said nozzle; and
   a display means for displaying an image of said jet-streaming of said molten solder, said image acquired by said image processing means.

5. The soldering apparatus according to claim 1, wherein said control means stores soldering conditions for each piece to be soldered, along with a position of said end of said nozzle relative to said piece to be soldered.

6. The soldering apparatus according to claim 1, further comprising a second control means connected to said control means via a communication line, wherein said second control means provides to said control means a control signal via said communication line in order to change at least a position of said end of said nozzle relative to said piece to be soldered.

7. The soldering apparatus according to claim 6, wherein said second control means stores soldering conditions for each piece to be soldered, along with the position of said end of said nozzle relative to said piece to be soldered.

8. The soldering apparatus according to claim 4, further comprising:
   a second control means connected to said control means and said image processing means via a communication line; and
   a second display means for displaying an acquired image inputted via said communication Line from said image processing means; wherein
   said second control means outputs a control signal via said communication line to said control means to change at least a position of said end of said nozzle relative to said piece to be soldered.

9. The soldering apparatus according to claim 8, wherein said second control means stores soldering conditions for said piece to be soldered, along with a position of said end of said nozzle relative to said piece to be soldered.

10. The soldering apparatus according to claim 2, wherein said front former has a front support shaft supported by said nozzle body, and said front former turns around said front support shaft.

11. The soldering apparatus according to claim 10, wherein said first drive means has a pressure rod that can be driven in a vertical direction and said front former has a U-shaped member provided so as to turn relative to said front support shaft, wherein an end of said U-shaped member is supported by said pressure rod.

12. The soldering apparatus according to claim 3, wherein said rear former comprises a rear support shaft supported by said nozzle body, said rear former turning around said rear support shaft.

13. The soldering apparatus according to claim 12, wherein said second drive means comprises a pressure rod that can be driven in a vertical direction and one end of said rear former is provided so as to turn relative to said rear support shaft, and wherein the other end of said rear former is supported by said pressure rod.

14. The soldering apparatus according to claim 2, wherein said front former is provided so as to turn relative to a support shaft, said first drive means comprising:
   a first lever-shaped member having two ends for moving said first lever shaped member in a vertical direction using an intermediate point between said two ends as a fulcrum, wherein one end supports said front former; and
   a first drive mechanism linked to an end of said first lever-shaped member and moving said end of said first lever-shaped member in a vertical direction.

15. The soldering apparatus according to claim 14, wherein said first drive mechanism includes:
   a first motor; and
   a first ascending/descending member performing ascending/descending movement according to a number of revolutions of said first motor, wherein one end of said first ascending/descending member is screwed to a rotating shaft of said first motor and another end of said first ascending/descending member is linked to said first lever-shaped member.

16. The soldering apparatus according to claim 3, wherein said rear former is able to turn with a support shaft as a fulcrum, and said second drive means comprises:
   a second lever-shaped member having two ends that move in a vertical direction and using an intermediate point thereof as a fulcrum and one end of which supporting said rear former; and
   a second drive mechanism linked to one of two ends of said second lever-shaped member, and moving said one of two ends of said second lever-shaped member in a vertical direction.

17. The soldering apparatus according to claim 16, wherein said second drive mechanism comprises:
   a second motor; and
   a second ascending/descending member, one end of which is screwed to a shaft of said second motor and, another end is linked to said second lever-shaped member, wherein said second ascending/descending member performs ascent and descent movement in correspondence with a number of revolutions of said second motor.

18. The soldering apparatus according to claim 1 further comprising a flux supply means supplying flux to said piece to be soldered, said flux supply means placed upstream of said solder bath in a conveying direction.

19. The soldering apparatus according to claim 18 further comprising a preheating means for preheating said piece to be soldered coated that is supplied with said flux, said preheating means placed between said flux supply means and said solder bath.

20. A soldering apparatus soldering a piece to be soldered by jetting out streams of molten solder accumulated in a solder bath, the apparatus comprising:
   a primary jet-stream nozzle jetting out streams of the molten solder contained in said solder bath;
   a secondary jet-stream nozzle having an end that can be moved, said secondary jet stream nozzle provided downstream in relation to said primary jet-stream nozzle in a conveying direction of said piece to be soldered and jetting out streams of the molten solder of said solder bath;
   drive means for setting a relative position between said end of said secondary jet-stream nozzle and said piece to be soldered; and
   control means for providing to said drive means a control signal corresponding to said relative position;
   wherein said secondary jet-stream nozzle comprises:
      a nozzle body;
      a front former provided at an end of said nozzle body on an upstream side of a conveying direction of said piece to be soldered; and
      a rear former provided at an end of said nozzle body on a downstream side of the conveying direction of said piece to be soldered;
      and wherein at least one of said front former or said rear former can be moved by said drive means receiving said control signal.

21. The soldering apparatus according to claim 20, wherein said drive means comprises a first drive means for setting a position and an angle of said front former in relation to said piece to be soldered.

22. The soldering apparatus according to claim 20, wherein said drive means comprises a second drive means for setting a position and an angle of said front former in relation to said piece to be soldered.

23. The soldering apparatus according to claim 20, further comprising:
   an image processing means for acquiring images of jet-streaming molten solder from said jet-stream nozzle; and
   a display means for displaying an image of said jet-streaming of molten solder, wherein said image is acquired by said image processing means.

24. The soldering apparatus according to claim 20, wherein said control means stores soldering conditions for each piece to be soldered, along with a position of said end of said secondary jet-stream nozzle relative to said piece to be soldered.

25. The soldering apparatus according to claim 20, further comprising a second control means connected to said control means via a communication line, wherein said second control means provides to said control means a control signal via said communication line in order to change at least a position of said end of said secondary jet-stream nozzle relative to said piece to be soldered.

26. The soldering apparatus according to claim 25, wherein said second control means stores soldering conditions for said piece to be soldered, along with a position of said end of said secondary jet-stream nozzle relative to said piece to be soldered.

27. The soldering apparatus according to claim 23, further, comprising:
   a second control means connected to said control means and said image processing means via a communication line; and
   a second display means for displaying an acquired image inputted via said communication line from said image processing means; wherein
      said second control means outputs a control signal via said communication line to said control means to change at least a position of said second end of said jet-stream nozzle relative to said piece to be soldered.

28. The soldering apparatus according to claim 27, wherein said second control means stores soldering conditions for said piece to be soldered, the position of said end of said jet-stream nozzle relative to said piece to be soldered.

29. The soldering apparatus according to claim 21, wherein said front former has a front support shaft supported by said nozzle body, and said front former turns around said front support shaft.

30. The soldering apparatus according to claim 29, wherein said first drive means has a pressure rod that can be driven in a vertical direction and said front former has a U-shaped member provided so as to turn relative to said front support shaft, and wherein an end of said U-shaped member is supported by said pressure rod.

31. The soldering apparatus according to claim 22, wherein said rear former comprises a rear support shaft supported by said nozzle body, said rear former turning around said rear support shaft.

32. The soldering apparatus according to claim 31, wherein said second drive means comprises a pressure rod that can be driven in a vertical direction and wherein one end of said rear former is provided so as to turn relative to said rear support shaft, and the other end of said reformer is supported by said pressure rod.

33. The soldering apparatus according to claim 21, wherein said front former is provided so as to turn relative to a support shaft, said first drive means comprising:
   a first lever-shaped member having two ends moving in a vertical direction and using an intermediate point between said two ends as a fulcrum, wherein one end supports said front former; and
   a first drive mechanism linked to one of two ends of said first lever-shaped member and moving said one of two ends of said first lever-shaped member in a vertical direction.

34. The soldering apparatus according to claim 33, wherein said first drive mechanism includes:
   a first motor; and
   a first ascending/descending member performing ascending/descending movement according to a number of revolutions of said first motor, where in one end of said first ascending/descending member is screwed to a rotating shaft of said first motor and another end of said first acceding/descending member is linked to said first lever-shaped member.

35. The soldering apparatus according to claim 22, wherein said rear former is able to turn using a support shaft as a fulcrum, and said second drive means comprises:
   a second lever-shaped member having two ends that move in a vertical direction using an intermediate point between said two ends as a fulcrum wherein one end of said second shape member supports said rear former; and a second drive mechanism linked to one of two ends of said second lever-shaped member, and moving said of said second lever-shaped member in a vertical direction.

36. The soldering apparatus according to claim 35, wherein said second drive mechanism includes:
a second motor; and
a second ascending/descending member, one end of which screwed to a shaft of said second motor, another end thereof being linked to said second lever-shaped member, wherein said second ascending/descending member performs ascent and descent movement in correspondence with a number of revolutions of said second motor.

37. The soldering apparatus according to claim 20 further comprising a flux supply means supplying flux to said piece to be soldered, wherein said flux supply means is placed upstream of said solder bath in a conveying direction.

38. The soldering apparatus according to claim 37, further comprising a preheating means for preheating said piece to be soldered that is supplied with said flux, wherein said preheating means placed between said flux supply means and said solder bath.

39. The soldering apparatus as set forth in claim 1 wherein said nozzle is a jet-stream nozzle.

* * * * *

UNITED STATES PATENT AND TRADEMARK OFFICE
CERTIFICATE OF CORRECTION

PATENT NO.     : 6,722,554 B2
DATED          : April 20, 2004
INVENTOR(S)    : Takashi Saito It is certified that error appears in the above-identified patent and that said Letters Patent is hereby corrected as shown below:

Column 21,
Line 6, "a-solder" should read -- a solder --.
Line 60, "Line" should read -- line --.

Column 24,
Line 57, "acceding/descending" should read -- ascending/descending --.

Signed and Sealed this

Twenty-eighth Day of December, 2004

JON W. DUDAS
*Director of the United States Patent and Trademark Office*